US011338833B2

(12) United States Patent
Soule et al.

(10) Patent No.: US 11,338,833 B2
(45) Date of Patent: *May 24, 2022

(54) ELECTRIC RAIL VEHICLE

(71) Applicant: Parallel Systems, Inc., Culver City, CA (US)

(72) Inventors: Matthew Soule, Culver City, CA (US); John Howard, Culver City, CA (US); Benjamin Stuart Stabler, Culver City, CA (US); Brian Ignaut, Culver City, CA (US)

(73) Assignee: Parallel Systems, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,919

(22) Filed: Aug. 24, 2021

(65) Prior Publication Data

US 2021/0380150 A1 Dec. 9, 2021

Related U.S. Application Data

(63) Continuation of application No. 17/335,732, filed on Jun. 1, 2021.
(Continued)

(51) Int. Cl.
*B60C 3/00* (2006.01)
*B61L 27/30* (2022.01)
(Continued)

(52) U.S. Cl.
CPC .............. *B61L 27/30* (2022.01); *B61B 13/00* (2013.01); *B61C 3/00* (2013.01); *B61L 27/40* (2022.01)

(58) Field of Classification Search
CPC .. B61L 27/0061; B61L 27/0077; B61L 27/30; B61L 27/40; B61B 13/00;
(Continued)

(56) References Cited

U.S. PATENT DOCUMENTS 4,245,561 A * 1/1981 Krug ..................... B61L 23/005
104/27
2004/0089188 A1* 5/2004 Lechner ................. B61B 13/00
104/93
(Continued)

FOREIGN PATENT DOCUMENTS

WO 2022006620 A1 1/2022

OTHER PUBLICATIONS

Wu, Xingwen, et al., "Analysis of steering performance of differential coupling wheelset", Journal of Modern Transportation, vol. 22, pp. 65-75 (2014).
(Continued)

*Primary Examiner* — Mark T Le
(74) *Attorney, Agent, or Firm* — Jeffrey Schox; Diana Lin

(57) ABSTRACT

A Rail Drone can include: a payload interface, a drivetrain, and a rail platform(515). The Rail Drone can additionally or alternatively include any other suitable set of components. The Rail Drone can integrate a standardized payload interface and an autonomous electric road vehicle platform into a rolling stock architecture. The Rail Drone can be a stand-alone, payload-agnostic, motive element which can be independently or cooperatively capable of carrying heavy loads across long distances at various cruising speeds.

21 Claims, 25 Drawing Sheets

Related U.S. Application Data

(60) Provisional application No. 63/032,196, filed on May 29, 2020.

(51) Int. Cl.
*B61B 13/00* (2006.01)
*B61C 3/00* (2006.01)
*B61L 27/40* (2022.01)

(58) Field of Classification Search
CPC ........... B61B 1/005; B61C 3/00; B61C 17/06; B61D 3/20; B61F 5/00; B61F 19/00; B61F 3/04
See application file for complete search history.

(56) References Cited

U.S. PATENT DOCUMENTS

| | | | |
|---|---|---|---|
| 2007/0107620 A1* | 5/2007 | Wagner | B61B 13/00 104/53 |
| 2012/0265378 A1* | 10/2012 | Peitzke | H02J 3/46 701/19 |
| 2013/0019774 A1 | 1/2013 | Ahuja et al. | |
| 2013/0333590 A1 | 12/2013 | Rodet | |
| 2015/0225003 A1* | 8/2015 | Morton | B61L 27/0038 701/19 |
| 2016/0167681 A1 | 6/2016 | Rodet | |
| 2017/0291618 A1 | 10/2017 | Karner et al. | |
| 2021/0070335 A1* | 3/2021 | Bjurstrom | B61L 27/0005 |

OTHER PUBLICATIONS

"Bogie designs, Extract from the Railway technical handbook, vol. 1, chapter 2, p. 24 to 41,", https://www.skf.com/binaries/pub12/Images/0901d1968019f48b-RTB-1-02-Bogie-designs_tcm_12-62732.pdf, PUB 42/P2 12782 EN—2012.

* cited by examiner

| Configuration | Product Description | Product Diagram |
|---|---|---|
| A | Traditional Train (Double Stacked) | |
| B | Linked-Car Drone-Assisted Wellcar Train | |
| C | Linked-Car Drone-Driven Double Stack Train | |
| D | Linked-Car Drone-Driven Flat Car Train | |
| E | Unlinked-Car Drone-Driven Flat Car Train-Guided Platoon | |
| F | Unlinked-Car Coupled-Drone Train-Guided Platoon | |
| G | Unlinked-Car Decoupled-Drone Train-Guided Platoon | |
| H | Unlinked-Car Decoupled-Drone Autonomous Platoon | |
| I | Unlinked-Car (Stacked) Decoupled-Drone Autonomous Platoon | |

FIGURE 3

| Class | Description | Icon |
|---|---|---|
| Component | Passive Bogie | |
| | Driving Bogie | |
| | Drone | |
| | Payload (Container) | |
| | Coupling | - |
| Rail Vehicle | Conventional Locomotive | |
| | Conventional Well Car | |
| | Conventional Flat Car | |
| | Coupled Parallel Car | |
| | Uncoupled Parallel Car | |

FIGURE 4

505: Standardized Payload Interface
510: Autonomous Drivetrain
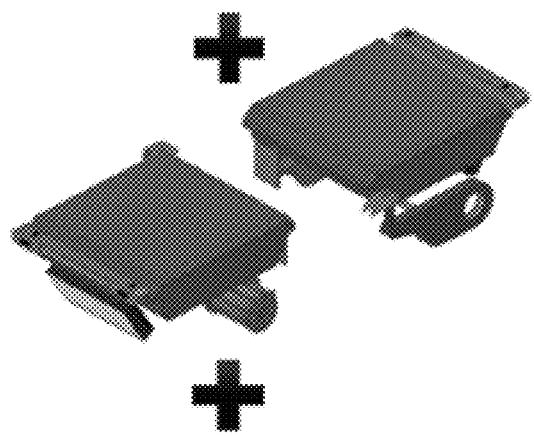
515: Rail Platform
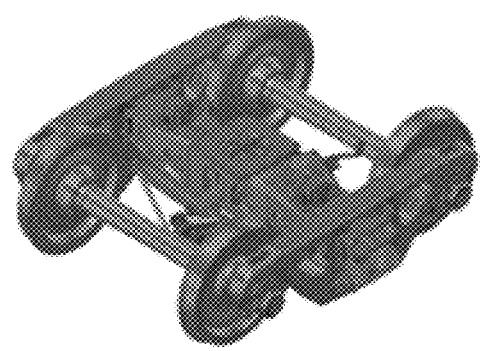
FIGURE 5

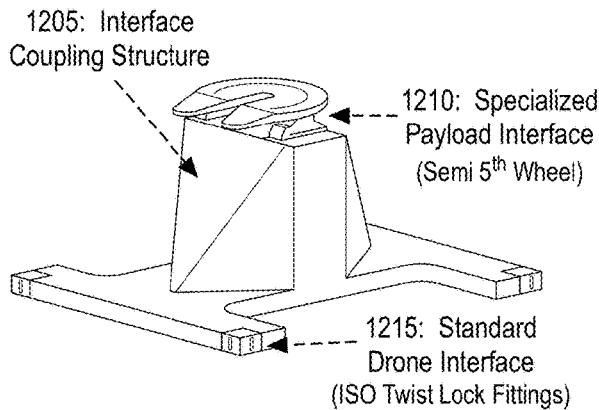

1205: Interface Coupling Structure
1210: Specialized Payload Interface (Semi 5th Wheel)
1215: Standard Drone Interface (ISO Twist Lock Fittings)

FIGURE 12A

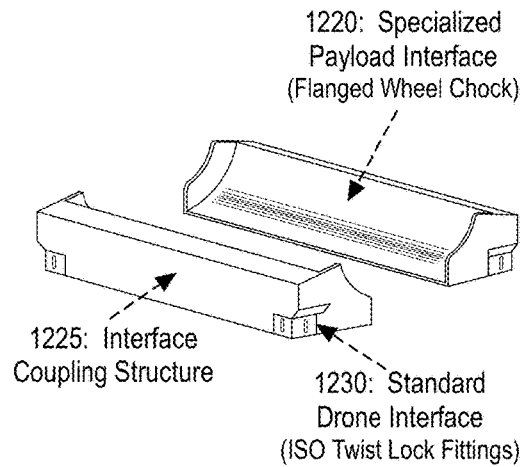

1220: Specialized Payload Interface (Flanged Wheel Chock)
1225: Interface Coupling Structure
1230: Standard Drone Interface (ISO Twist Lock Fittings)

FIGURE 12B

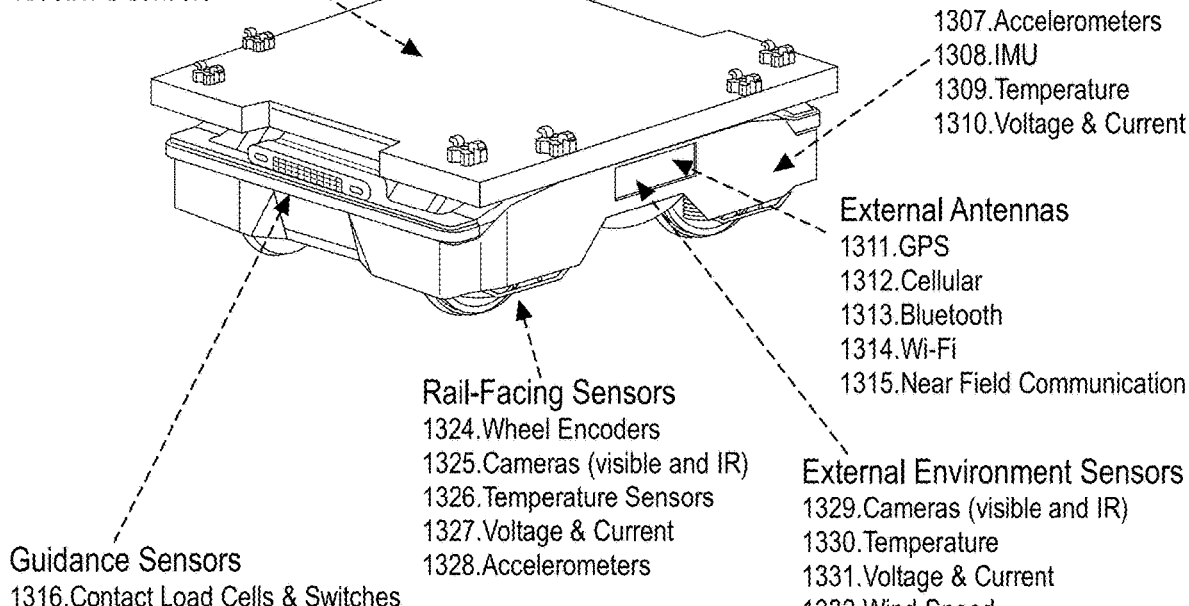

Payload-Facing Sensors
1301. Force Sensors & Switches
1302. Cameras (visible and IR)
1303. Lights (visible and IR, illumination and indication)
1304. Accelerometers
1305. NFC sensors Internal Sensors
1306. Force Sensors
1307. Accelerometers
1308. IMU
1309. Temperature
1310. Voltage & Current External Antennas
1311. GPS
1312. Cellular
1313. Bluetooth
1314. Wi-Fi
1315. Near Field Communication Rail-Facing Sensors
1324. Wheel Encoders
1325. Cameras (visible and IR)
1326. Temperature Sensors
1327. Voltage & Current
1328. Accelerometers External Environment Sensors
1329. Cameras (visible and IR)
1330. Temperature
1331. Voltage & Current
1332. Wind Speed
1333. Accelerometers Guidance Sensors
1316. Contact Load Cells & Switches
1317. Cameras (visible and IR)
1318. Lights (visible and IR, illumination and indication)
1319. Rangefinders
1320. Horn
1321. Sonar
1322. Radar
1323. LIDAR

FIGURE 13

2405: Two Payloads Sharing One Rail Drone Vertically

2505: Two Payloads Sharing One Rail Drone Horizontally

2605: Four Payloads Sharing One Rail
Drone Horizontally and Vertically

2705: Rail Drone   2710: Existing Flatcar   2715: Rail Drone

2805: Rail Drone   2810: Existing Passenger Car   2815: Rail Drone

Load sensors on end(s) of Rail Drone (bogie or payload interface) contact adjacent vehicles during platooning to verify contact, and measure/control platooning aid forces Sustained contact between adjacent Rail Drones rail platoon load sharing

ELECTRIC RAIL VEHICLE

CROSS REFERENCE TO RELATED APPLICATIONS

This application is a continuation of U.S. application Ser. No. 17/335,732, filed 1 Jun. 2021, which claims the benefit of U.S. Provisional Application No. 63/032,196, filed 29 May 2020, each of which is incorporated herein in its entirety by this reference.

TECHNICAL FIELD

This invention relates generally to the rail transportation field, and more specifically to a new and useful electric vehicle system and/or method in the rail transportation field.

BRIEF DESCRIPTION OF THE FIGURES

FIG. 3 is a diagrammatic representation of example configurations of parallel product integration in variants of the Architecture.

FIG. 4 is a legend for the diagrammatic representations in FIG. 3.

FIG. 5 is an example of a rail drone in a variant of the Architecture.

FIGS. 12A-B are a first and second example of payload adapter fittings in a first and second variant of the Architecture, respectively.

FIG. 13 is an isometric view of a rail drone including sensor arrangements in a variant of the Architecture.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

A Rail Drone 500, an example which is shown in FIG. 5, can include: a payload interface 505, a drivetrain 510, and a rail platform 515. However, the Rail Drone 500 can additionally or alternatively include any other suitable set of components. The Rail Drone can integrate a standardized payload interface and an autonomous electric road vehicle platform into a rolling stock architecture. The Rail Drone can be a stand-alone, payload-agnostic, motive element which can be independently or cooperatively capable of carrying heavy loads across long distances at various cruising speeds.

By way of example, the descriptions here apply to autonomous rail transportation, but in some instances the principles described herein may apply to non-rail autonomous transportation configurations.

Rail can be a more efficient means of surface freight transportation. As much freight volume as possible can be placed on the rail system to maximize economic output by reducing energy consumption, but current freight train architectural constraints limit multi-modal transportation solutions to 500 miles or more. Variants of the rail vehicle can be provided at lower costs that enables multi-modal freight transportation over distances as short as 50 miles.

The disclosed Architecture is a new mode of transport for freight. The architecture includes hardware, software (including firmware) and combinations thereof. Autonomous vehicles can work together to carry a variety of payloads from origin to destination on existing rail infrastructure. Through the reduction of labor costs through autonomy, the reduction of fuel costs through electrification, and the streamlining of shipping logistics afforded by discretization, the disclosed Architecture aims to reduce the cost and time associated with the relocation of freight between origin and destination pairs.

Figure 1:
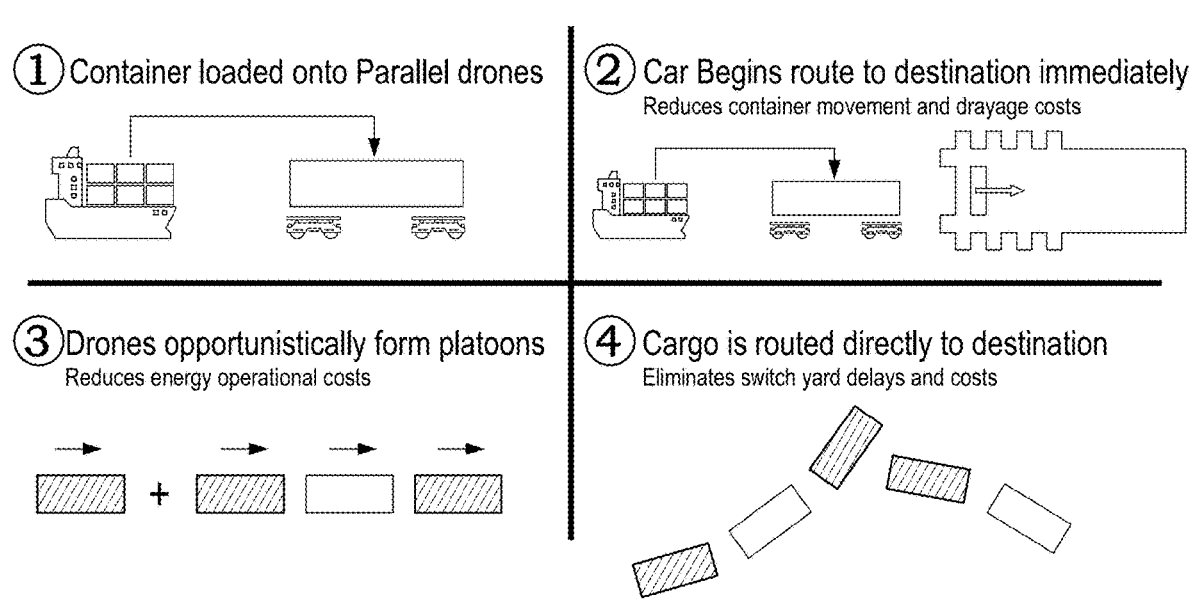
FIG. 1 is a schematic example of a process flow for a variant of the Architecture.

FIG. 1 outlines a high-level operational sequence of the disclosed Architecture. A group of payloads destined for a variety of customers arrives at the origin. Payloads are loaded onto cars (1) and immediately depart as unloading progresses (2). During transit, cars form platoons to reduce drag and improve range (3). The platoon of cars breaks apart based on destination so cars can deliver their payloads to their final destinations (4).

The Architecture can have one or more operational phases, or times when the drone, car, or platoon experience some major state change. State changes can include modifications to their physical configuration, the direction of travel, or the location where they interface with a new entity. These state changes can drive the interfaces, functional requirements, success criteria, and performance measurements that can be considered in hardware development. Operational phases can include: Loading: The placement of payloads to onto cars (#1 in process flow); Departure: Payloads beginning transit after loading (#2 in process flow); Transit: The movement of cars to destinations; Platooning: The grouping of cars to reduce and share work (#3 in process flow); Switching: The transitioning of cars between rails (#4 in process flow); Charging: Transferring energy to the battery; Transfer: The relocation of payloads between cars, if necessary; Arrival: Car arrives at terminal where it can be unloaded; Unloading: Taking payloads off cars; Delivery: The release of payloads from cars to their destination; and/or any other suitable operational phases.

Figure 2:
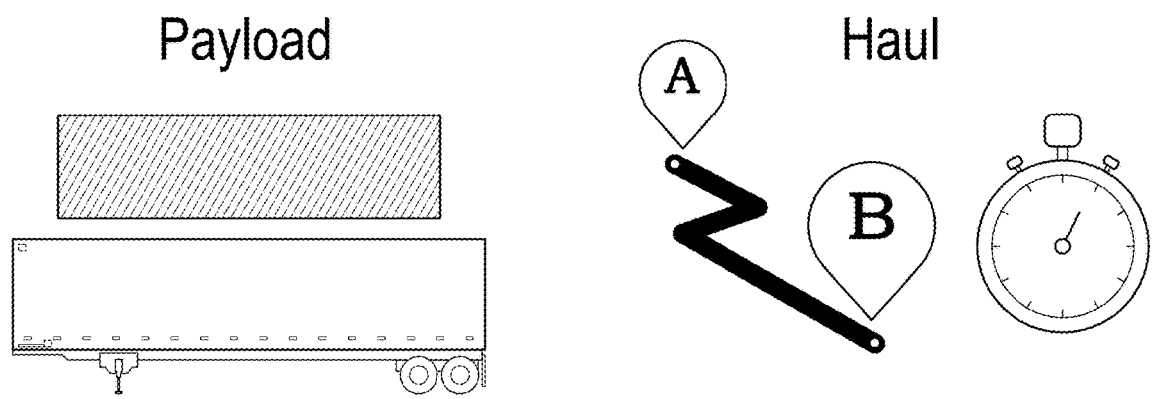
FIG. 2 is a pictorial distinction between a payload and a haul.

The inputs and outputs of the disclosed Architecture related to the shipping outcomes (e.g., which are paid for by a customer) can include: something (a payload) being shipped somewhere in some agreed amount of time (a haul). In an example, the inputs and outputs can be a Payload: Something to be shipped (e.g., a single container or trailer); and a Haul: The payload's movement between origin and destination at some speed (an example is shown in FIG. 2).

The disclosed Architecture can have one or more operational locations, the places where major state changes (operational phases) occur. Like the operational phases, the nature of operational locations can drive many of the interfaces, functional requirements, success criteria, and performance measurements that may be considered in hardware development. Operational locations can include an Origin: Where a haul or payload is delivered for relocation; a Switch: a location where a Drone transitions between rail segments; a Switch Yard: a location during transit where payloads may be reconfigured; a Crossing: a location where the Drone's path can be routinely crossed by something else; a Charging Station: where the vehicle's batteries can be charged; a Loading Station: where the payload is installed or removed from the drone/car; a Destination: where a haul or payload can be picked up after relocation/traversal; and/or any other suitable operational locations.

2. EXAMPLES OF RAIL INTEGRATION

FIG. 3 includes example configurations which represent varying degrees of architecture integration into existing rail systems (a legend is shown in FIG. 4). Configuration A includes the current highly coupled train architecture and Configuration I includes a fully autonomous and/or discretized rail architecture.

In Configuration A, working from the leading end of the train (right) to the trailing end (left), a locomotive (grey rectangle with one notched end) with three driving bogies (small rectangle with horizontal lines underneath the locomotive) is mechanically linked (short black line) with another locomotive to pull a long chain of intermodal well cars. Each well car has a main car body (long narrow grey rectangle) supported by two passive bogies (small rectangle with vertical lines below the car body). On top of each well car body, payloads (checkered boxes) are placed for transport, some of which are small (shorter checkered rectangle) and some of which are long (longer checkered rectangle). These may rest alone or be stacked (checkered rectangles on top of each other) with two short payloads on the bottom (two small checkered rectangles below one large one) or with long payloads on top and bottom.

In Configuration B, some of the conventional train propulsion (locomotive described in Configuration A) have been replaced by one or more Rail Drones (small rectangle with diagonal lines) which may be coupled (black line) to one another as well as the remainder of the train. Note that the locomotive may not have to perform as much tractive effort (changing some of its driven bogies represented by small rectangles with horizontal lines to passive bogies represented by small rectangles with vertical lines) if the included Rail Drones (small rectangle with diagonal lines) provide sufficient propulsion. By replacing locomotive propulsion with Rail Drones, the cost and emissions of energy used to move the train may be reduced due to the Rail Drone's battery-electric powertrain.

In Configuration C, Rail Drones (small rectangle with diagonal lines) have replaced some passive bogies (small rectangles with vertical lines) used below conventional rolling stock (well car bodies represented by long grey rectangles). This reduces the amount of tractive effort required by external locomotives, further improving cost and cleanliness of the overall assembly.

In Configuration D, a customized rail car body (different, in this case longer, narrow grey rectangle) is used in a drone-powered, physically connected rail car architecture. This car design eliminates the use of double stacking of payloads (checkered boxes) so they can be installed directly over the Rail Drones supporting each car, reducing the drag-inducing payload gap which can exist between cars and further improving efficiency of the train.

In Configuration E, the couplings (black lines) between rail car bodies (long narrow grey rectangles) have been removed, relying on controls within the Rail Drones (small rectangle with diagonal lines) to maintain the overall configuration of the train. This is an instance of software-implemented platooning. A locomotive remains in the train for guidance. The locomotive may be located in front, within, or behind the platoon, and may be coupled with some but not all of the cars. By physically decoupling cars, the real estate and overhead associated with the assembly and reconfiguration of trains may be reduced.

In Configuration F, the car bodies (long narrow grey rectangles) spanning rail drones (small rectangle with diagonal lines) have been shortened to match the overall length of the payload (checkered boxes). This minimizes all gaps between payloads in the train and improves its overall aerodynamic performance.

In Configuration G, the car bodies (long narrow grey rectangles) have been removed entirely. Payloads (checkered boxes) now rest directly on Rail Drones (small rectangles with diagonal lines), eliminating the need to match any car structures to payload configurations. This simplifies train assembly logistics and reduces overhead associated with relocating unloaded rolling stock.

In Configuration H, the need for a guiding locomotive (grey rectangle with notched corner) has been eliminated through use of fully autonomous controls for Rail Drone (small rectangles with diagonal lines) movement. One, some, or all of the drones could have fully autonomous control.

Finally, in Configuration I, multiple payloads (checkered boxes) have been installed on Rail Drones (small rectangles with diagonal lines) to reduce the amount of rolling stock needed to move a group of payloads. In addition to grouping payloads on a Rail Drone vertically, they could alternatively or also be shared horizontally.

4. BENEFITS

In variants, the system and/or method can enable discretization for a rail system. In such variants, the disclosed Architecture may enable a group of payloads arriving at an origin to be more readily discretized and operated as a collection of individual payloads. This discretization may permit more efficient and rapid movement of goods during transit between origin and destination. Critical enablers for discretization may include propulsion and control at a payload level. One possible embodiment of a payload level propulsion system is a combination of batteries and electric motors. Other embodiments include traditional combustion powertrains, combustion-electric powertrains, or fuel cell powertrains. Discretization of payloads allows specification of their individual direction within a larger group of payloads departing an origin together, reducing the need for intermediate transfer or reconfiguration in switching yards. Instead, transfer may occur during transit itself via re-assembly or re-configuration of platoons. Control of these discretized units may be performed at a drone, car, payload, platoon, haul, or whole-system level. A fleet management system could be tasked with managing the coordinated movement of drones, cars, or platoons.

In variants, the system and/or method can enable collaboration between cars and/or vehicles. In such variants, the disclosed Architecture may enable payloads to operate or be operated collaboratively. This collaboration could improve the efficiency, expediency, and safety of the payloads during transit from origin to destination. One key element of payload collaboration is their ability to travel near another while moving in a shared direction. In this case, close proximity may mean a small enough distance for the payloads to benefit from one another's local operation and may be a small fraction of the car's overall length. Benefits of this proximity may include reduced aerodynamic drag, reduced disruption at locations of interest such as intersections, or improved navigation of obstacles like hills, corners, or weather. Factors which govern the performance of a platoon may include vehicle spacing and number of vehicles in a platoon. Generally, minimization of spacing between vehicles of a platoon is desirable. Generally, maximization of number of vehicles in a platoon is desirable. Over the course of a journey payloads may contact each other within a platoon (zero spacing), and/or maintain a small (constant or varying) spacing via active control. Collaboration may also aide in the smooth operation of departure and arrival. Since payloads can operate independently, they can depart and arrive independently. This independent departure and arrival may simplify terminal logistics, matching terminal processing bandwidth with the rate of departure or arrival. This independent departure and arrival may not preclude their cooperation during transit, forming or re-forming platoons to improve efficiency. Scheduling and prioritization of payload movement may also be improved or achieved through collaboration between payloads. If departure or arrival need to be metered, the movement of payloads and platoons can be changed mid-transit to maximize efficiency while meeting the needs of origin, destination, or transfer locations. In the case that payloads are identified as higher priority, their travel may be expedited or further controlled through re-arrangement of platoons or payloads before, during, or after transit. Payloads may also collaborate by pushing one another to balance load, power, or energy within a platoon.

In variants, the system and/or method can enable automation for a rail system. In such variants, the disclosed Architecture may enable the movement of payloads within a haul to be more automated. Since payloads may be individually propelled and may be fitted with computers, radios and sensors, their movement can be controlled with decreasing levels of human involvement, with the potential to eliminate human involvement entirely. Automation may occur at several levels and to varying degrees within the Parallel product, including within a car, within a platoon, within a haul, within a shipping corridor, within a fleet, or within the entire shipping network. Within a car, automation may allow multiple physically decoupled drones to carry some portion, or all, of a payload collaboratively. This automation may include control of payload interfaces, traction motors, braking, and sensors. The operational burden of drones within a car could be shifted or shared through a payload depending on their energy storage, health, or fault state. One drone may assume the primary, or master, role within a car, while another may assume a secondary or slave role. The external operation of this car could occur via internal controls, or alternatively could be directed by another source (like following other cars, platoons, vehicles, or control centers). Within a platoon, automation may allow multiple cars to coordinate their movement. The coordinated operation of their motor, braking, and sensor resources may help manage gaps to reduce drag or compensate for anisotropy within the platoon like varying energy storage, health, or faults. This controlled platoon could operate largely independently or assume one or more master-slave groups. The overall operation of this platoon could be via internal controls, or alternatively could be directed by another source (like following other cars, platoons, vehicles, or control centers.) A variety of sensors may be used to enable this automation. These may take the form of something as simple as a single camera or may use a more advanced suite of sensors like LIDAR, radar, sonar, more complex cameras which image different light spectrum ranges, or encoders. Sensors may be placed on the vehicle but may also be placed within the route itself in key areas. Sensors may be installed on only the lead vehicle, on specific vehicles within a platoon, or on every vehicle, and could be pointed in just one or multiple directions. Automation can use used for servicing and charging. Telemetry from the product may be used to schedule repairs or inspections of the drones as well as its operating infrastructure. In the case that charging is needed, routes may be planned to have charging occur in areas with lower cost energy, or the customer may be charged for higher energy costs in the case that the product is re-routed through a higher cost area. Charging automation may come via the identification, pursuit, and engagement of charging infrastructure. Activation of charging hardware like electrified third rails may occur through near-field communication or other local networking methods. Selection of charging locations may occur based on final destination, state of charge, hardware health, and platoon properties as well as opportunities. Benefits of automation may also be applied outside of the shipping functionality of the product. Using the sensing and computing resources on the vehicle, the Rail Drone may perform inspection services for rail infrastructure as it travels. These sensors may be what's already on the vehicle, but may be additional sensors like temperature sensors, laser profilometers, optical profilometers, eddy current sensors, and accelerometers. These sensors, as well as the other sensors on the vehicle, may be powered by the central bus, via batteries, or via power extraction sources which operate off of attached hardware vibration. Communication with sensors may be via wired, wireless, or ground plane connection.

In variants, the system and/or method can enable flexibility for a rail system. In such variants, the disclosed Architecture may enable the more flexible movement of payloads within and between hauls. Here, flexibility applies to how the Rail Drones can be allocated, what they can carry, and how they can travel. The low-profile nature of the drone and car designs may allow the product to be efficiently relocated based on need. Especially in the case that cars include independent drones, the unloaded configuration of a platoon will have significantly lower mass, frontal area, and wetted area, reducing the energy necessary to relocate rolling stock to an area with increased haul demand. By using a simplified payload interface which may take the form of twist locks or other hardware used to interface with ISO containers, the drones may have the ability to handle a wide variety of immediately available payloads. Simplification may include an arrangement of these interfaces in a simple fashion, for example in a common plane or planes, and may help them accept payload adapter fixtures to restrain payloads which don't immediately interface with the standard fitting layout. Some, all, or none of those interfaces need to be active or even be used to carry a payload. The simplest interface, which is no specialized interface at all, is also a possibility. This may take the form of a flat surface, or one with some number of side walls or features for application of other fastening provisions. Symmetry across some portions of the drone may be used to further reduce its operational constraints. For example, symmetry of the payload interface may allow the payloads to be installed pointing in either direction of the road, and symmetry of the vehicle sensor array may allow it to operate autonomously in either direction on the rail. This may help reduce or eliminate the need to reposition or reorient the drone between hauls. Symmetry applies to the physical configuration of the drone as well as its operation.

5. SYSTEM

A Rail Drone 500, an example which is shown in FIG. 5, can include: a payload interface 505, a drivetrain 510, and a rail platform 515. However, the Rail Drone 500 can additionally or alternatively include any other suitable set of components. The Rail Drone can integrate a standardized payload interface and an autonomous electric road vehicle platform into a rolling stock architecture. The Rail Drone can be a stand-alone, payload-agnostic, motive element which can be independently or cooperatively capable of carrying heavy loads across long distances at various cruising speeds.

In FIG. 5, payload interface 505 is combined with an autonomous drivetrain 510 and a rail platform 515 to create the Rail Drone assembly. The payload interface 505 is tasked primary with interfacing with the Rail Drone's payload, and rests on a load bearing feature or features on the rail platform 515. The Autonomous drivetrain 510 may include one or multiple traction motors, batteries, and supporting controls. This drivetrain is coupled to the rolling elements of the rail platform 515 such that it may move under its own power. The drivetrain and rail platform may be intimately mated to one another, or be joined via an intermediate structure which bonds to one or multiple mechanical subassemblies of the Rail Platform.

However, the system can include any other suitable components.

5.1 SUBSYSTEM OVERVIEW

The result of combining the major hardware elements shown in FIG. 5 can be a Rail Drone. This vehicle can be introduced based on its external (FIG. 6) and internal (FIG. 7) assemblies.

Figure 6:
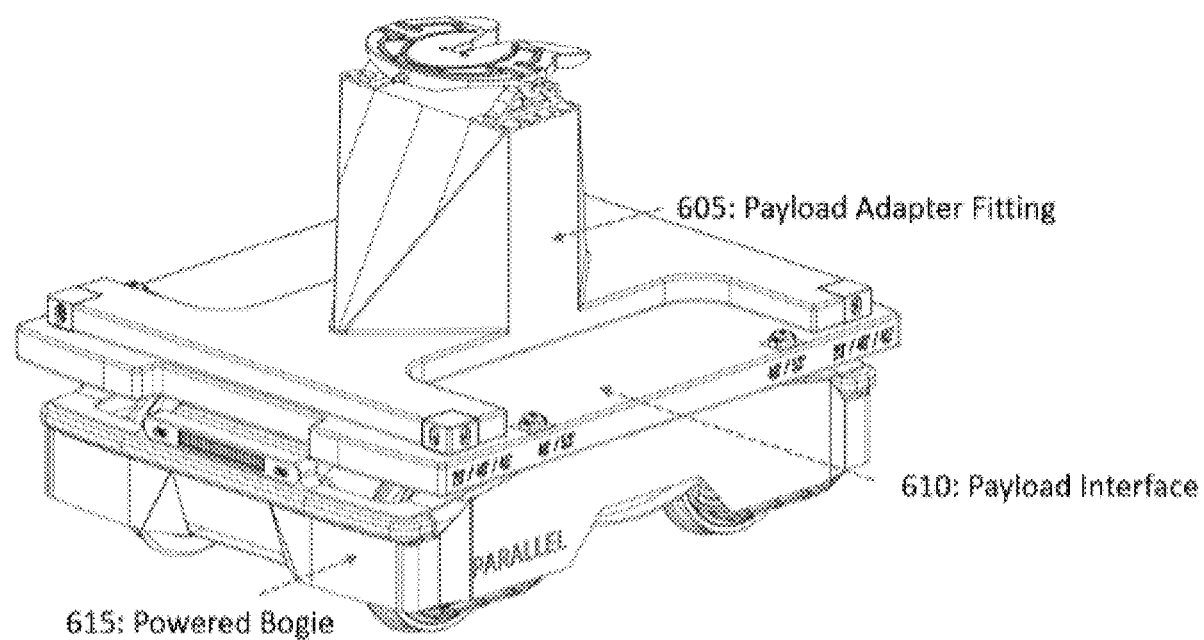
FIG. 6 is an isometric view of a rail drone in a variant of the Architecture.

FIG. 6 provides an overview of the major assemblies of a Rail Drone as seen by an outside observer. The powered bogie 615 is the combination of the autonomous drivetrain 510 and rail platform 515 from FIG. 5. The payload interface 610 is designed to interface with a handful of common payloads through standardized fittings. When the fitting layout of 610 does not directly match or restrain the payload, a payload adapter fitting 605 may be used to attach the payload to the Rail Drone's standardized payload interface 610. It should be noted that, in the case of Configurations B through F in FIG. 3 where payloads (checkered boxes) aren't interfacing directly with Rail Drones (small rectangles with diagonal lines), a simpler and less functionally flexible design for the payload interface 605 may be used.

Figure 7:
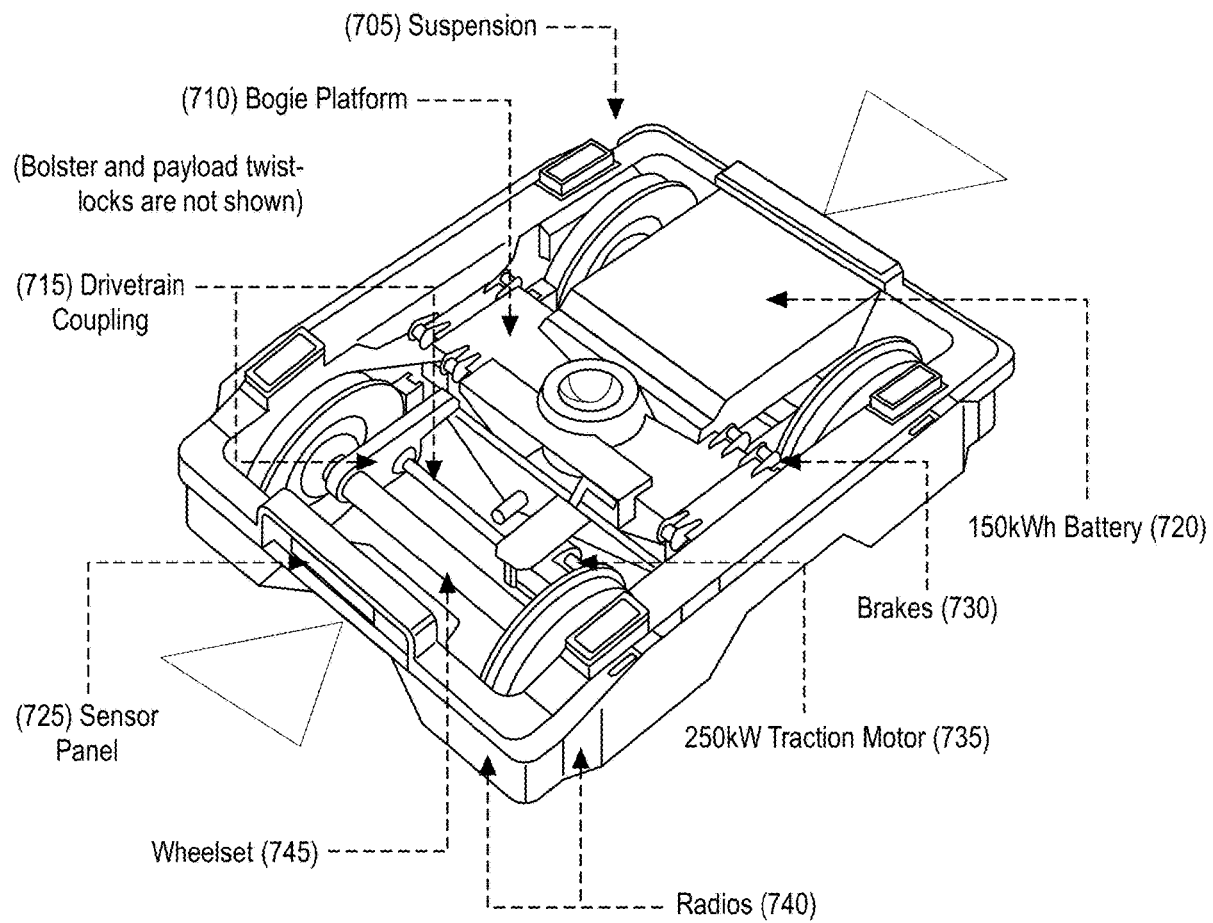
FIG. 7 is a trimetric view of a rail drone in a variant of the Architecture.

When the payload interface 610 in FIG. 6 is removed from the Rail Drone, additional internal assemblies may be observed as shown in FIG. 7. The various elements of 510 from FIG. 5 are shown here, including a drivetrain coupling 715 which couples a traction motor 735 to the bogie platform 710 wheelset 745. The traction motor is powered by a battery 720 mounted to the bogie platform 710. The wheelsets 745 may be joined with the bogie platform 710 with suspension 705, though some bogies may forego primary suspension 705 in favor of secondary suspension on top of or within the bogie platform itself 710. As with other autonomous drivetrains 510, the vehicle may use sensors 725 and radios 740 to endow the vehicle with the ability to navigate and communicate with its external environment.

Traditional freight trains use the combination of fuel tanks and diesel engines for energy storage and traction motors for reaction. Commuter trains some freight trains use externally supplied electricity with internal traction motors. Furthermore, some trains use a combination of internal and external energy supply to allow operation in the case of intermittent or sustained loss of external power. All of these existing power architectures may be used to propel a Rail Drone as part of or replacement for elements 510, 720, and 735. The design shown below uses a battery 720 for storage and a traction motor 735 for reaction. Additional energy supply options in place of what's shown in 720 may include internal combustion, fuel cells, solar panels, and fly wheels. In the case of flywheels, this energy storage method may also improve vehicle rollover stability. Additional energy reaction options in place of what's shown in 735 may include direct mechanical drive from a combustion engine or electric motors. Motors may be self-commutated or externally commutated, synchronous or asynchronous, AC or DC, internally or externally excited, use permanent magnets or excited windings, and may be of various phases (one, two or three for example). Motors 735 may be separate from wheelsets 745 or use alternative mounting configurations such as axle or wheel mounting. In the place of motors 735 coupled to wheelsets 745 with drivetrain couplings 715, a linear electric motor may also be used.

The pictured vehicle uses two wheelsets 745 including an axle and two wheels. The drone may instead use fewer or more wheelsets, and may use split rather than solid axles.

The suspension 705 (if used) and bogie platform 710 are used to bridge the gap between the wheelsets and payload mounting platform. It should be noted that the major structural elements of a bogie platform 715 may also be referred to as the sideframe, bolster, or chassis. Multiple levels of spring or spring-damper combinations may be used between the wheelsets 745 and payload mounting location (traditionally the center of the bogie platform 710) and it may also be possible to rigidly couple the assemblies. The exact suspension arrangement of the bogie depends on the degree of mechanical isolation which is desired between different vehicle subsystems, if any.

Figure 8:
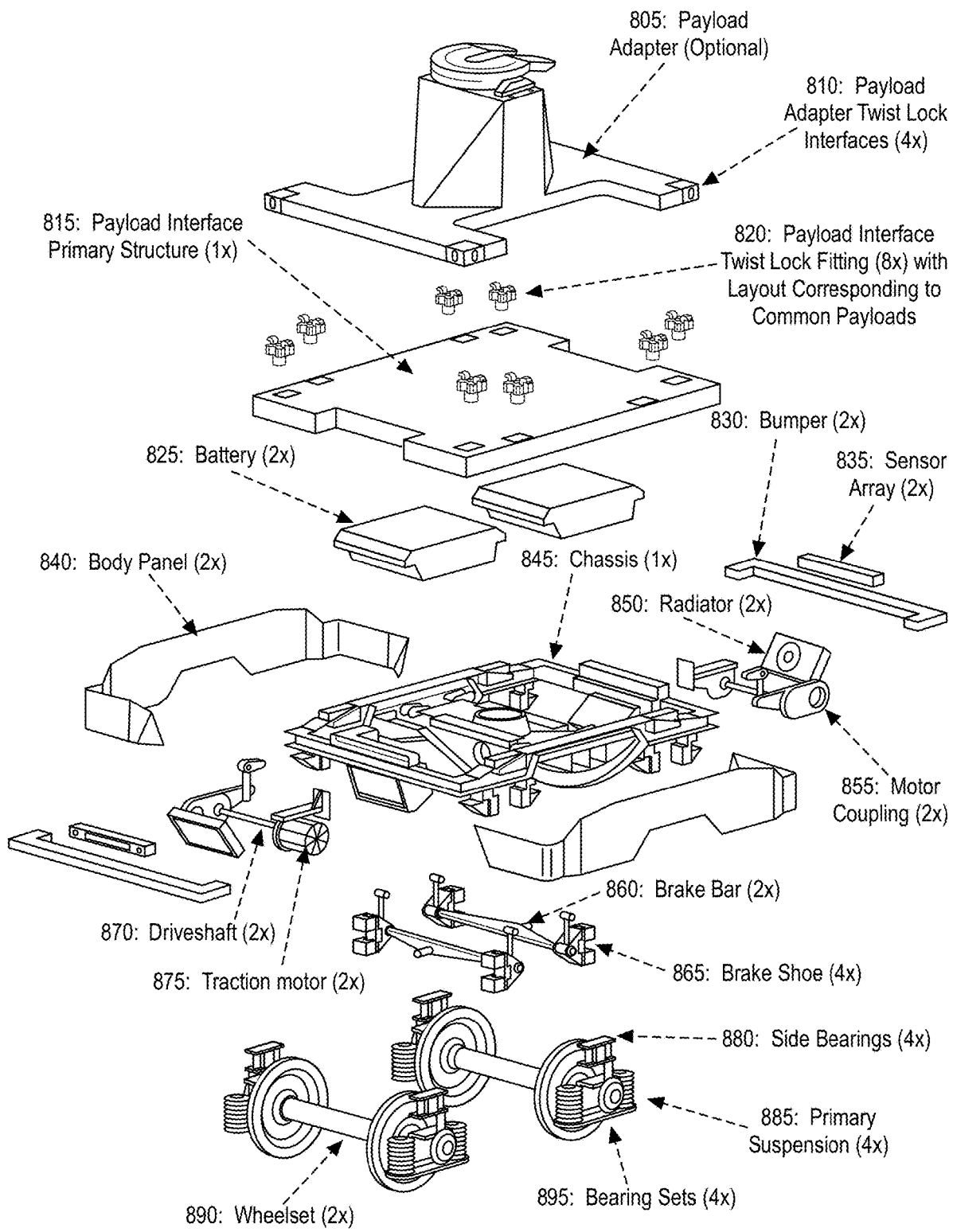
FIG. 8 is an exploded view of a rail drone in a variant of the Architecture.

FIG. 8 further elaborates on the various components and subassemblies which make up the Rail Drone's major assemblies.

The autonomous drivetrain shown in 510, 715, and 735 is shown in further detail above. An articulated driveshaft 870 may be used to link the traction motor 875 to the motor coupling 855, accommodating movement between the wheelset 890 and the motor mounting location, in this case the chassis 845. To cool the traction motor 875 and/or battery 825, a radiator 850 may be installed on the Rail Drone.

FIG. 8 also highlights additional structural and mechanical components. Brake bars 860 are hung from the bogie chassis 845 and carry brake shoes 865 which are pressed against the rolling surfaces of wheelsets 890 with a linear actuator (not shown). The drone uses primary 885 suspension to provide mechanical isolation between the wheelsets 890 and chassis 845, and side bearings 880 are used to react large pitch or yaw loads about the payload interface 815. The wheelsets 890 rotate on bearing sets 895 which rest either in the primary suspension 885 or directly in the chassis 845. Body panels 840 are mounted to the bogie chassis 845 to protect its internal components.

FIG. 8 also adds additional detail to the payload interface 610 and payload adapter 605 designs. The payload interface 610 includes a primary structure 815 which carries a number of fittings 820 which attach to matching features in payloads. When these fittings don't line up directly with the payload, the payload adapter 805 uses its own matching features 810 to interface with those fittings 820 and offer more specialized attachment points for different payloads.

While FIG. 8 shows a Rail Drone using a Y-25 bogie platform, a three-piece Bettendorf-style bogie may also be used. In this case, no substantial primary suspension 885 is used, and the chassis 845 is split up into three pieces: two sideframes and one center bolster which spans the sideframes. In this design, secondary suspension rests between the center bolster and sideframes. The autonomous drivetrain 510 and its supporting components may mount on the center bolster with the aid of additional structure. To span movement of the secondary suspension in this design, the motor coupling 855 may be mounted to the side frame and the motor 875 may be mounted to the center bolster structure, with the driveshaft 870 spanning the two. Though the three-piece bogie design affects the configuration of the chassis 845, primary suspension 885, and secondary suspension, the remainder of the subsystems including the payload interface design 505, 605, 610, 805, 810, 815, 820 remain the same.

5.2 PAYLOAD INTERFACE

The Rail Drone's payload interface 610 is designed to maximize direct, unmodified compatibility with a large portion of freight being moved via rail while also offering an avenue to connect with a variety of other payloads. Though the use of a specific fitting layout and automated actuation, the amount of user interaction required to configure and install payloads on Rail Drones may be reduced.

Figure 9:
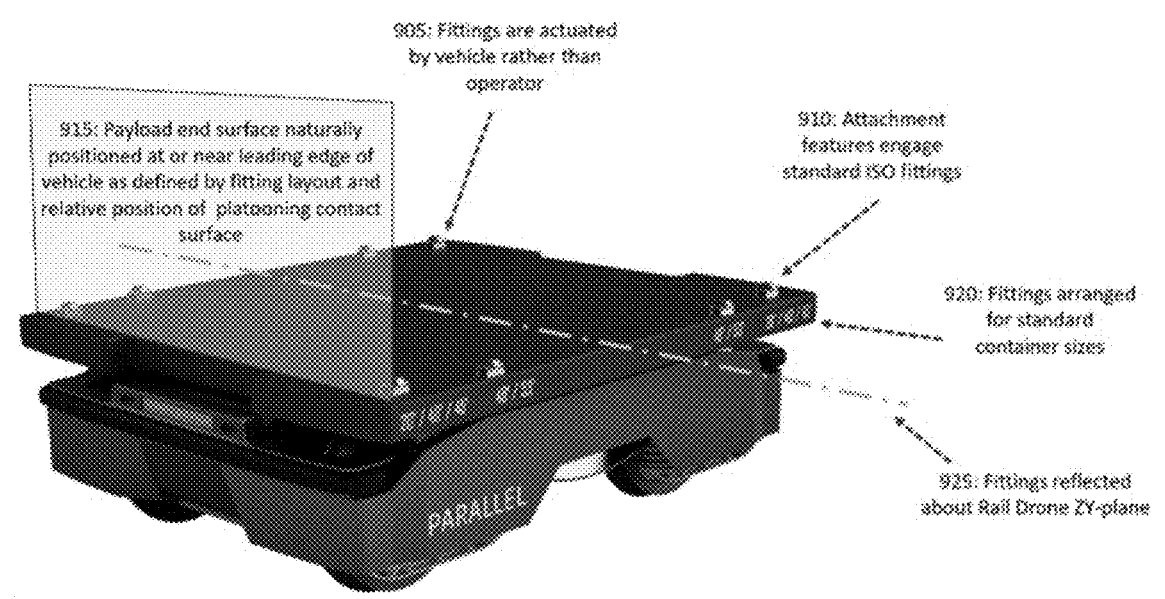
FIG. 9 is an isometric view of a rail drone in a variant of the Architecture, illustrating a payload interface fitting layout.
Figure 10:
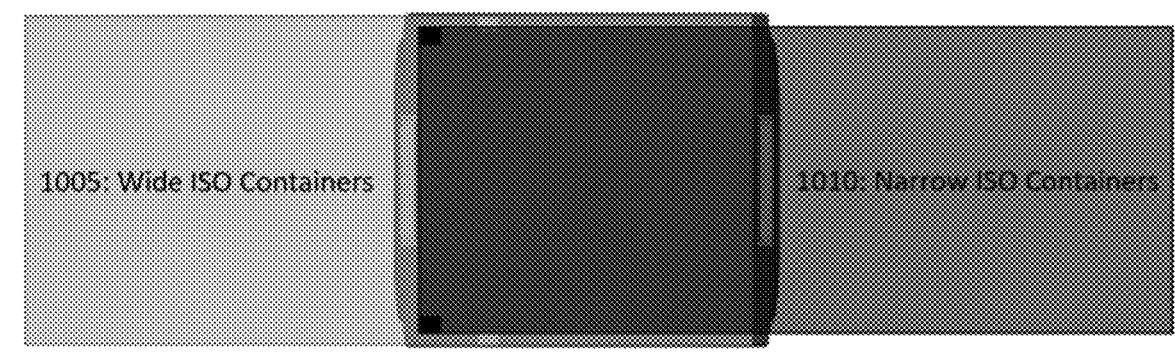
FIG. 10 is a top view of a rail drone in a variant of the Architecture, illustrating ISO container orientations relative to the fitting layout.

In FIGS. 9 and 10 above, industry-standard fittings 910 for ISO containers are positioned 920 in such a way that containers of different sizes 1005 1010 are naturally positioned near or at the edge 915 of the Rail Drone. This passive reduction in distance between the payload's end surface and the Rail Drone's platooning contact surface results in a corresponding reduction in aerodynamic drag while traveling at speed.

To make the payload interface more flexible, the fitting layout 920 1005 1010 may be reflected about the plane normal to the vehicle's direction of movement 925, allowing payloads to be loaded facing in either direction of movement and eliminating the need to reorient the drone based on payload, sequence, or destination.

Figure 11:
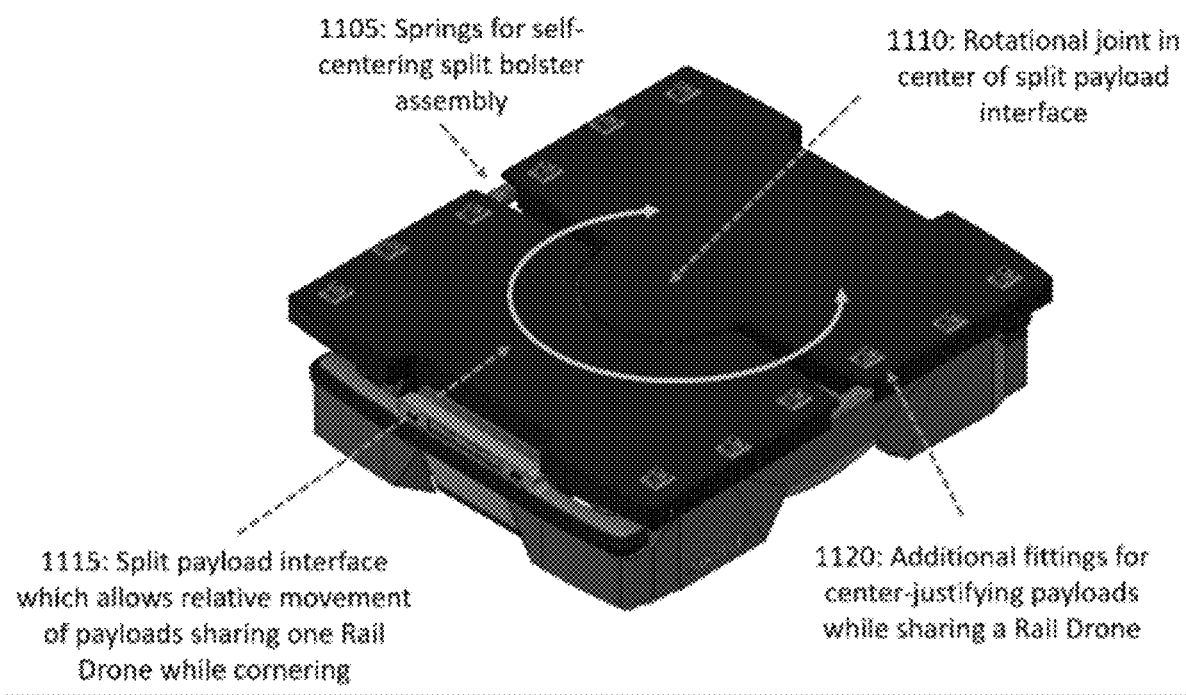
FIG. 11 is a trimetric view of a rail drone which includes a split payload interface in a variant of the Architecture.

To reduce the number of Rail Drones being used for a given number of payloads being shipped, a single Rail Drone may be shared by two payloads. This is frequently used in current rail industry intermodal well cars. FIG. 11 shows a payload interface which includes an additional rotational joint which permits relative movement of payloads being carried when navigating curved track.

In the split payload interface design, a rotational joint 1110 is installed in the center of the payload interface 610 along with additional fittings 1120. When two payloads are installed on one Rail Drone, they payloads may use the additional fittings 1120 to center-align their inner surfaces for minimum gaps 915. When the payloads and shared Rail Drone are cornering, relative yaw rotation of the payloads about the Drone's Z-axis is permitted by the split interface design 1115 and the rotational joint 1110 it employs. To improve stability, springs 1105 may be installed between the split sections to ensure the assembly self-centers while on straight track.

When payloads don't immediately match the standard payload interface's fitting layout, payload adapter fittings may act as a structural coupling between the Rail Drone's standard payload interface and some payloads' more specialized attachment hardware.

These adapters may include standardized receptacles for the Drone fittings which are laid out in such a way to match the Drone's payload interface. An interface coupling structure spans the Rail Drone's payload interface and the Specialized Payload Interface, both of which may vary significantly by payload. Examples of the Specialized Payload Interface would be surface and flanges to constrain the tires of a semi-trailer (an example is shown in FIG. 12B), or the fifth wheel bracket for a semi-trailer (an example is shown in FIG. 12A). In a first example, as shown in FIG. 12A, a Specialized Payload Interface 1210 can be adapted to constrain a semi-trailer fifth wheel, and can be used with an interface coupling structure 1205 and a standard drone interface 1215. In a second example, as shown in FIG. 12B, a Specialized Payload Interface 1220 can be a flanged wheel chock adapted to constrain the tires of a semi-trailer, and can be used with an interface coupling structure 1225 and a standard drone interface 1230.

5.3 SENSORS AND COMMUNICATIONS

In order to support its autonomous operations and generate value for the customer, the Rail Drone may be outfitted with a variety of sensors as shown in FIG. 13. These sensors may be tasked with a variety of duties including internal vehicle monitoring 1306-1310, external vehicle environment monitoring 1329-1333, payload verification 1301-1305, rail monitoring 1324-1328, and external communication 1311-1315. Most importantly, the addition of guidance sensors 1316-1323 may endow the Rail Drone with the ability to operate autonomously, both on their own, as well as within cars, platoons, corridors, fleets, and overall networks. Though the FIGURE below lists examples of sensors which may be used for each function, the actual list may be longer or shorter.

5.4 EXAMPLE STRUCTURES

In one example of a bogie platform, configuration a conventional rolling stock base may be used as a foundation on which the Rail Drone is built. Modification to these existing bogie platforms are needed to achieve compatibility with the disclosed Architecture. Low-floor bogies may be used to leave space for volume-hungry assemblies like batteries and motors, reducing the overall vehicle profile and improving its aerodynamic efficiency.

Figure 14:
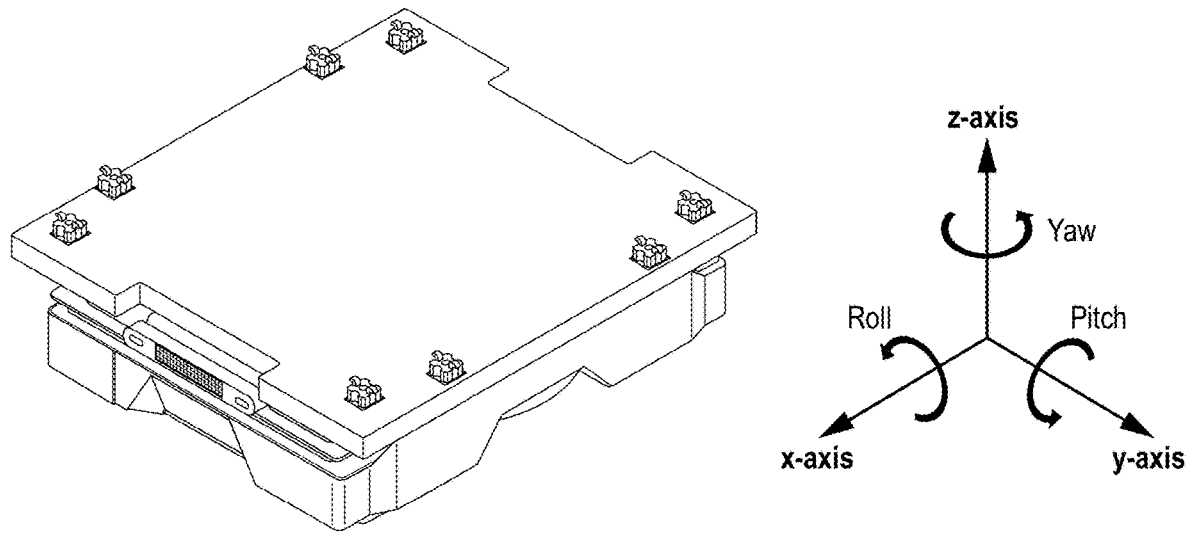
FIG. 14 is an isometric view of a rail drone in a variant of the Architecture, which illustrates a rail drone coordinate system.
Figure 15:
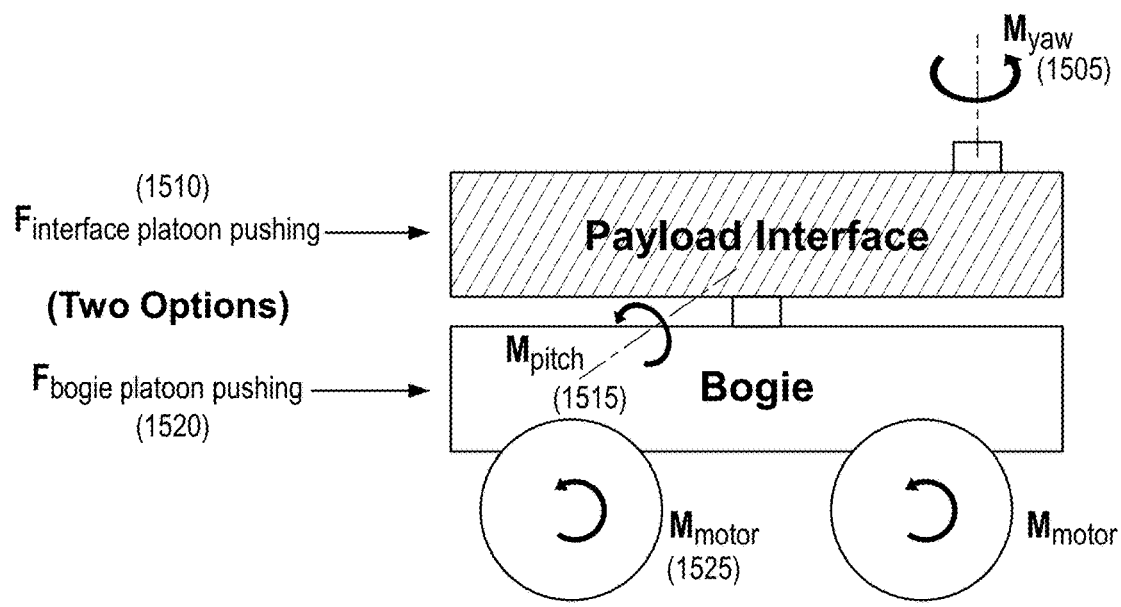
FIG. 15 is a schematic representation of load cases in a rail drone in a variant of the Architecture.

In one example, the uncoupled nature of the Rail Drones while carrying a payload may introduce unique load cases (an example is shown in FIG. 15, for axes shown in FIG. 14) for rolling stock which may require new considerations in bogie design.

In one example embodiment of the disclosed vehicle, load-sharing 1510 and off-nominal loading of payloads can result in large moments around the bogie's Y-axis 1515, potentially requiring features like additional side bearings 880 to be added to counteract those forces. This additional support differs from traditional rolling stock whose continuous structure (Configurations A-F of FIG. 3) allows resistance of pitch rotation through the combined normal forces delivered by the bogies' center pivots.

The bogie-payload interface connection can react a new pitch moment 1515 formed around its coupling due to removal of the continuous structure spanning the two vehicles (Configurations A-F of FIG. 3). Elimination of the traditional rail car's continuous structure also opens the possibility of yaw moments around the payload fasteners 1505, increasing their required shear load tolerance. The installation of motors on the bogies requires that torque be applied 1525 about the axle and transmitted to the wheels. Though motor-driven axles and axle-mounted brakes are routinely used in bogie constructions across the rail industry, they are not common in the majority of bogies employed in a fully assembled freight train. Lastly, there is potential for an additional point of loading for the bogie itself in the case that platoon loads are carried through the bogie frame 1520, though this could also be routed through the bolster 1510 in a similar way to a traditional rail car body (Configurations A-F of FIG. 3).

One unique consideration for the Rail Drone and the overall disclosed Architecture is the reduced magnitude of loads to its rolling stock. Due to elimination of discrete car bodies in Configurations G-I of FIG. 3, the minimum load case on rolling stock is significantly lower than most train cars which may affect their dynamics. Design and tuning of suspension design 880 885 to achieve sufficient stability in such dissimilar loaded and unloaded configuration can be achieved. This could occur through tuning of spring rates within suspension, addition additional springs in parallel to carry different loads at different rates, and/or addition of damping features to reduce the severity of excitation.

A change that comes with the use of self-propelled cars is the lack of significant loads transmitted longitudinally 1510 through cars during operation. This reduced load may help stability of the train while going around curves, where compressive and tensile loads caused by the combined weight of long freight trains may increase transverse (predominantly Y-axis) loads which contribute to derailing. Since longitudinal (predominantly X-Axis) loads are only used for augmentation rather than primary propulsion in the disclosed Car as disclosed herein and Platoon disclosed herein, the magnitude of these transverse loads will be reduced which in-turn reduces the likelihood of derailing in those operating cases.

5.5 SUSPENSION

The suspension 880 885 and chassis 845 of the Rail Drone are used to bridge the gap between the wheelsets 890 and payload interface structure 815. Suspension hardware may be grouped into primary 885 and secondary suspension groups, with primary suspension isolating the wheels from the bogie structure and secondary suspension isolating the bogie structure from the payload interface. The degree of isolation, if any, for each one of these subsystems will vary based on the external operating environment for the Rail Drone and acceptable transmitted environment for the payload.

While some elements of the suspension may can remain in the payload's load path, other elements may be used during specific or off-nominal load cases. Side bearings 880 may be used to provide additional support to the payload in the case of higher pitch or roll moments.

Due the increased potential for pitch loads 1515 due to the independent Rail Drone architecture (Configurations G-I in FIG. 3), additional features beyond what's traditionally seen on bogies, such as a second pair of side bearings, may be added to react loads during loading and platooning. It may also be necessary to add secondary suspension between the chassis 845 and payload interface 815 to further isolate the payload from the rail environment.

The suspension may deliberately constrain or unconstrain different degrees of freedom for the payload interface. Due to the need for the assembled car to navigate curved track, it is desired to have reduced yaw stiffness of the payload interface, most often in the form of a center pivot. To mitigate the risk of yaw excitation while in movement, lateral springs or dampers may be added to the assembly. Some constraints, such as pitch resistance, may vary within or between Rail Drones to avoid over constraint and its associated loading on the payload.

5.6 CHASSIS

The bogie assembly may be of a design which is unique or may be a modification or enhancement of an existing design. Existing designs fall into two classifications: Passive (or trailer) bogies and motor bogies. Motor bogies feature propulsive drive trains and are often utilized in Locomotives and Transit rail vehicles. Passive bogies are rarely equipped interfaces for energy storage or propulsion. Since the Rail Drone is tasked with propelling its payload, some modifications will need to be made if passive rolling stock architectures are to be used. Even in the case that motor bogies are used, the unique requirements of the Rail Drone including energy storage and autonomy sensor installation may require modification to their designs. The disclosed bogies largely support and react vertical loads with some shear caused by turning and drag. Analysis can be done to determine which bogie design is most cost effective: a unique Parallel design, modification existing passive bogie designs, or modification of existing motor bogie designs.

Figure 16A:
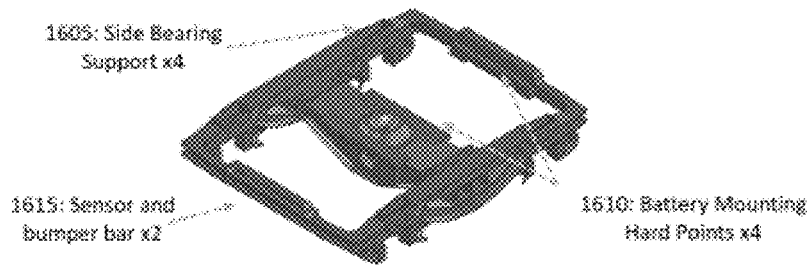
FIGS. 16A, 16B, and 16C are a first, second, and third isometric view of a chassis for a first, second, and third variant of the rail drone, respectively.
Figure 16B:
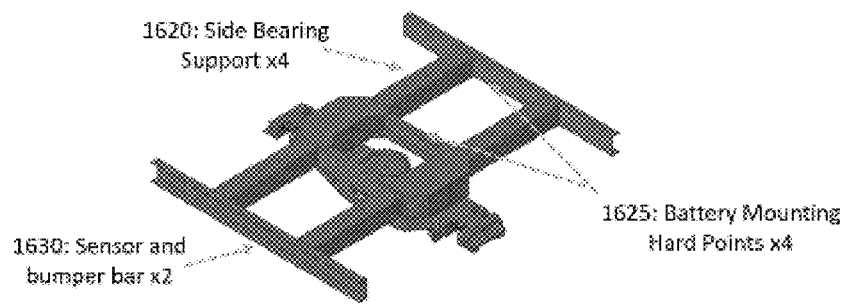
Figure 16C:
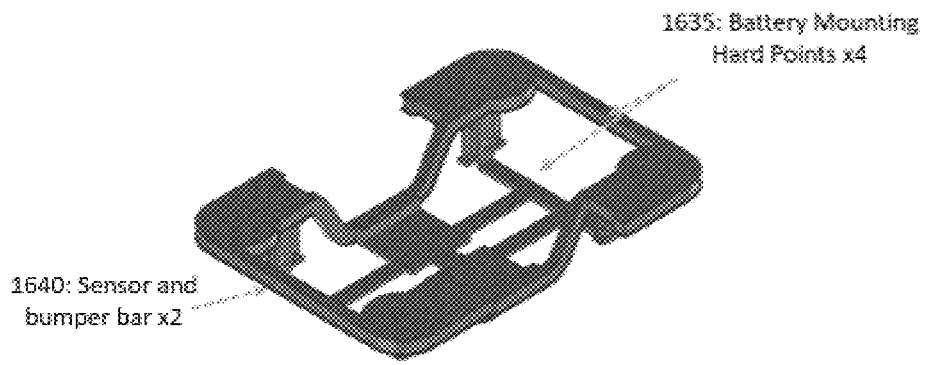

Examples of unique elements of the Rail Drone chassis 845 are its need to react battery 825 loads, platooning loads 1520 (if that load path is chosen), higher shear loads due to driven axles 1525, and pitch loads 1515. Modifications may include installation of structure to support additional side bearings 1605 1620, structural members at the drone's ends to react compressive platooning loads 1615 1630 1640, and addition of structural mounting surfaces inside the chassis to support battery assemblies 1610 1625 1635 (e.g., examples are shown in FIG. 16A-C).

5.7 BRAKES

Reduction of a drone's velocity (braking) may be achieved in several different ways including, but not limited to, regenerative (energy recovery though use of electric drive train to recover energy) braking, actuated friction brakes applied to disks or wheel surfaces, and magnetic brakes applied to disks or rails. Friction based brake devices may be pneumatically (potentially in the form of local compressors, actuators, reservoirs, and/or cylinders) or electrically actuated. Regenerative braking systems may leverage the primary traction motors and traction batteries, as such it could provide the lowest cost, maintenance, and system complexity. Alternatively, a dedicated regenerative braking using electrical (battery, capacitor, or otherwise) or pneumatic energy storage may be used. To protect batteries from hazardous over-voltage or over-current events during rapid deceleration with an electric-based system, the batteries' maximum State of Charge (SoC) may be reduced to less than 100% during charging of the batteries. This reduced SoC may provide margin for battery voltages to increase during charging, while staying below a hazardous voltage limit. Alternatively, the system may include a chopper circuits to protect the batteries. These circuits may include switches to divert the power from the battery to dynamic brake resistors.

Fault tolerance in this system may be employed in order to prevent runaway stock, derailment, or other hazards. Fault tolerance may be achieved with redundant systems or components, either of which may be dissimilar. The system may fault to braking or release in the event of a hardware fault, and those fault states may differ based on which system is causing the failure.

The physically decoupled nature of the Rail Drone (Configurations E-I in FIG. 3) may require that each vehicle have independently operating brake systems. The activity of braking may require coordination between multiple drones when operating in proximity. These cases could include paired drones of a car, paired cars of a platoon, or two independent drones in proximity. This synchronization may occur through a local wireless network, software triggers off load cells, or hardware triggers off contact points. It is possible that the primary braking and grouped braking systems may be independently operating or could be one and the same.

Figure 17:
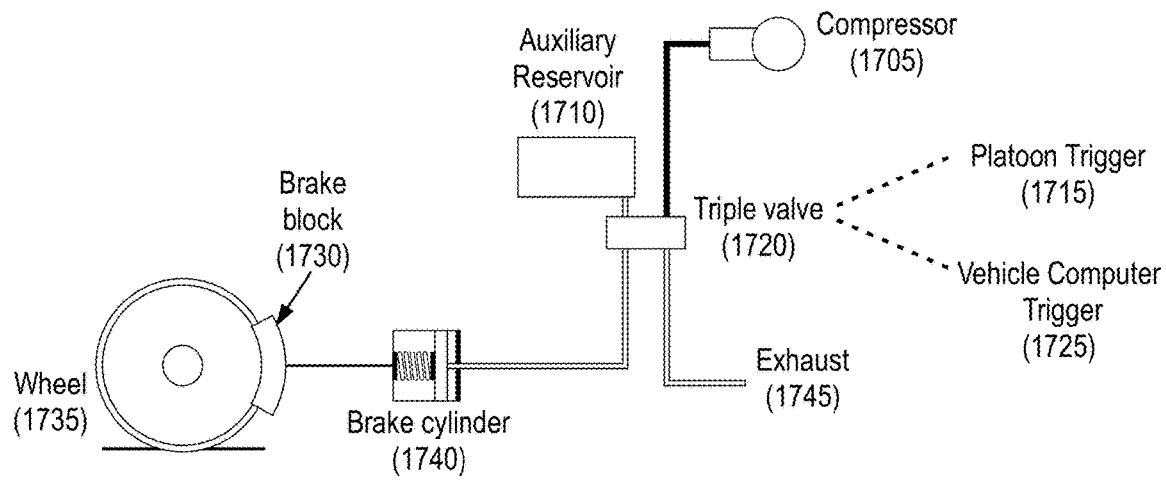
FIG. 17 is a schematic diagram of a brake system for a rail drone in a variant of the Architecture.

For an air brake system (an example is shown in FIG. 17), a compressor 1705 may charge a reservoir 1710 which is directed with a triple (directional control) valve 1720 to the exhaust 1745 or brake cylinder 1740 lines. In this design, the triple valve 1720 nominally vents the brakes 1740 until the valve 1720 is triggered 1715 1725 to apply pressure 1705 to the brake cylinder 1740 which compresses the brake block 1730 against the wheel tread 1735. If power is lost to the compressor or vehicle, the brakes can still be powered by the auxiliary reservoir 1710 and triggered through fault tolerant controls 1715 1725 or through spring return of the triple valve 1720, stopping the vehicle.

Figure 18:
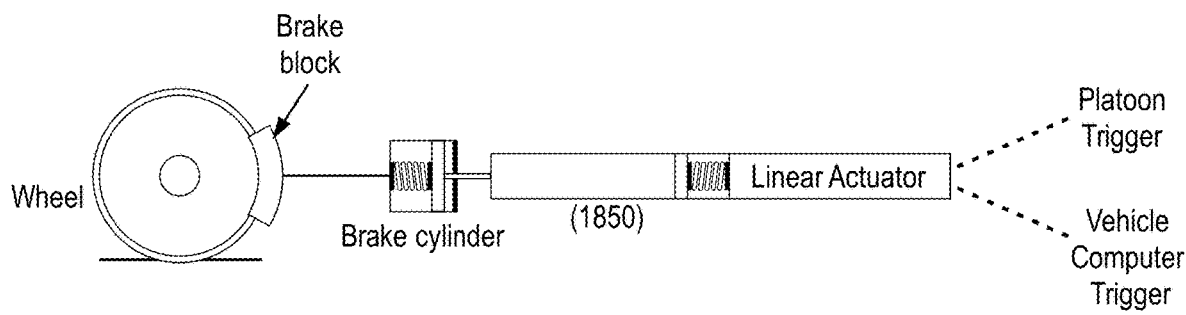
FIG. 18 is a schematic diagram of a brake system for a rail drone in a variant of the Architecture.

Electrohydraulic systems are similar to pneumatic systems but replace the compressor system 1705 1710 1720 1745 with linear actuator driven hydraulic line 1805 which drives the brake cylinder 1740 (an example is shown in FIG. 18).

Figure 19:
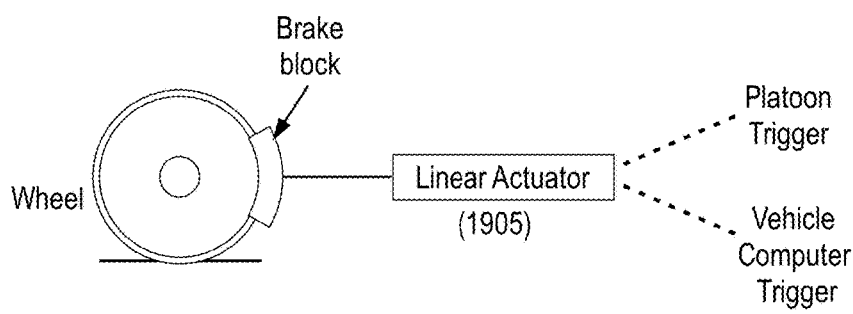
FIG. 19 is a schematic diagram of a brake system for a rail drone in a variant of the Architecture.

Electromechanical systems see an additional level of simplicity, eliminating the hydraulic assembly 1805 and brake cylinder 1740 with mechanical coupling between a linear actuator 1905 and the brake block 1730 (an example is shown in FIG. 19).

5.8 RAIL CAR CONFIGURATIONS

Figure 20:
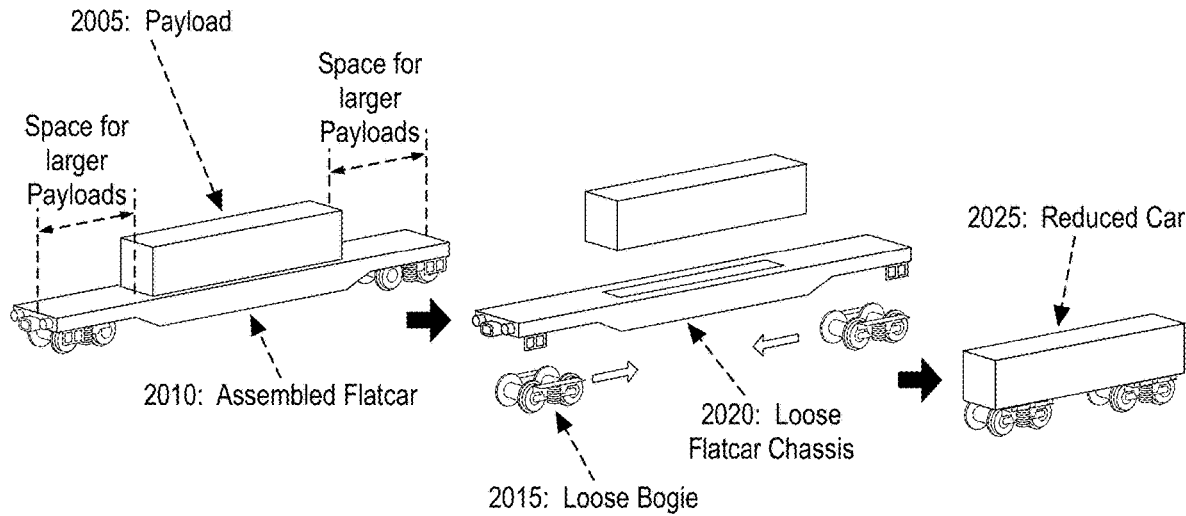
FIG. 20 is a diagrammatic representation of a variant of the Architecture.
Figure 21:
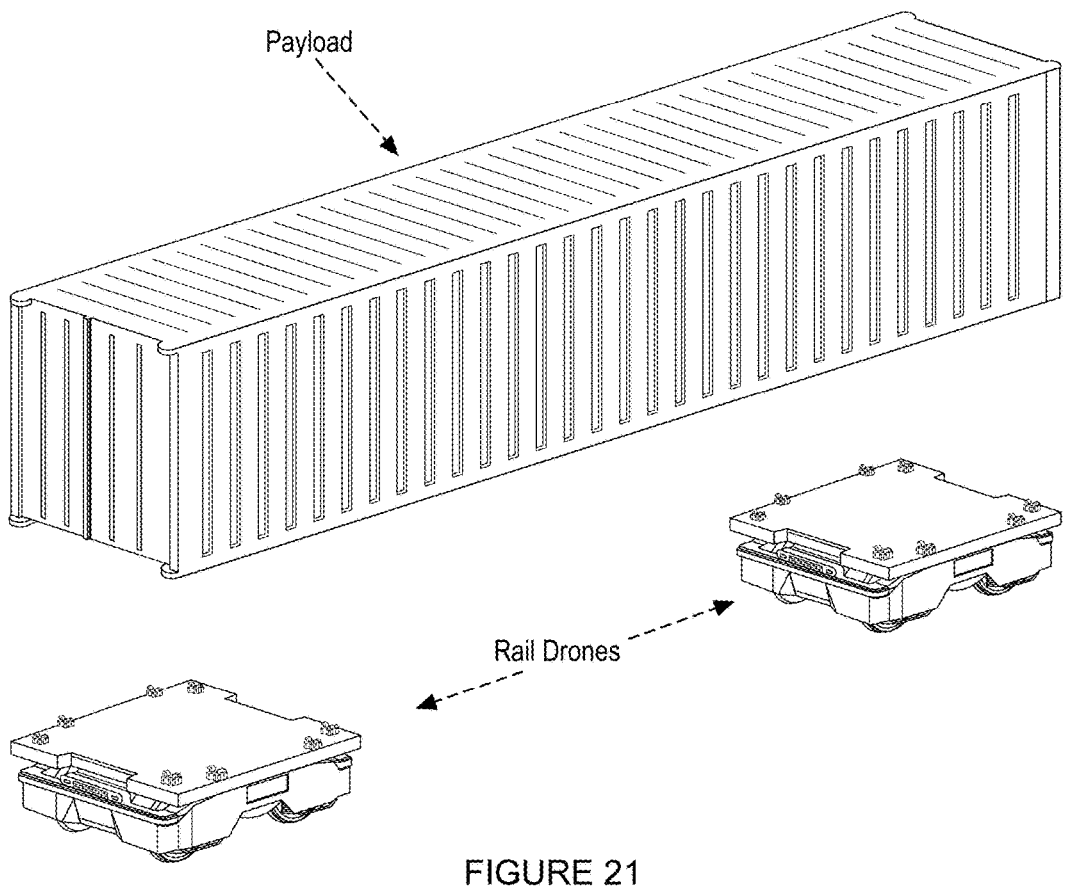
FIG. 21 is an exploded view of rail car in a variant of the Architecture.

An embodiment of an example Rail Car (or Car) as shown in Configuration G of FIG. 3 is a combination of at least one payload and at least one rolling element to make an independently operating piece of rolling stock. This basic architecture 2025 can be seen as eliminating the chassis 2020 of an existing railcar 2010 and placing its payload 2005 directly on its loose bogies 2015 (examples are shown in FIG. 20 and FIG. 21). The additional features outlined in preceding sections describe the additional modifications and hardware which are required to make the reduced car configuration 2025 possible and practical.

Unlike traditional rail cars 2010 whose operating length is that of the largest payload they are designed to carry, the Rail Car's length may be set by the payload itself upon install onto the Rail Drones' payload adapter fittings 610. This payload-driven configuration may help reduce the size, mass, and drag associated with movement of a payload between its origin and destination, especially when operating in a platoon.

Figure 22:
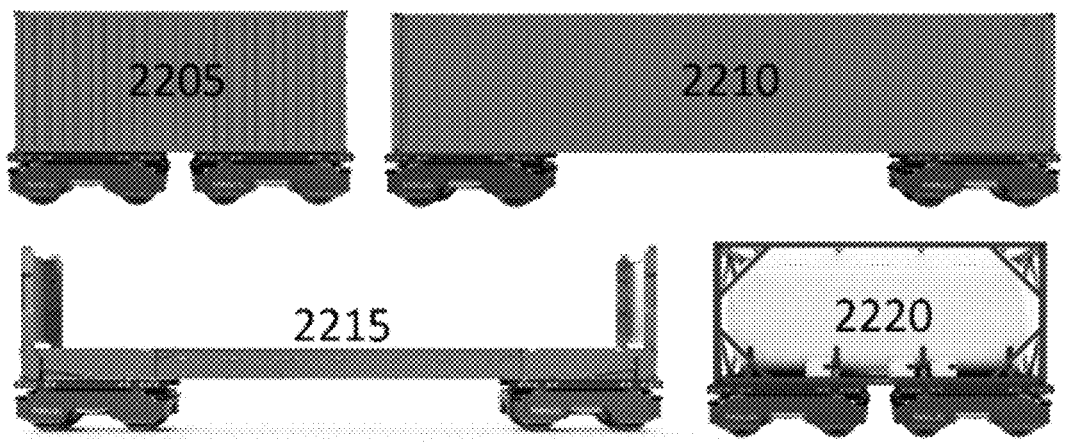
FIG. 22 is a side view representation of various rail car configurations for variants of the Architecture.
Figure 23:
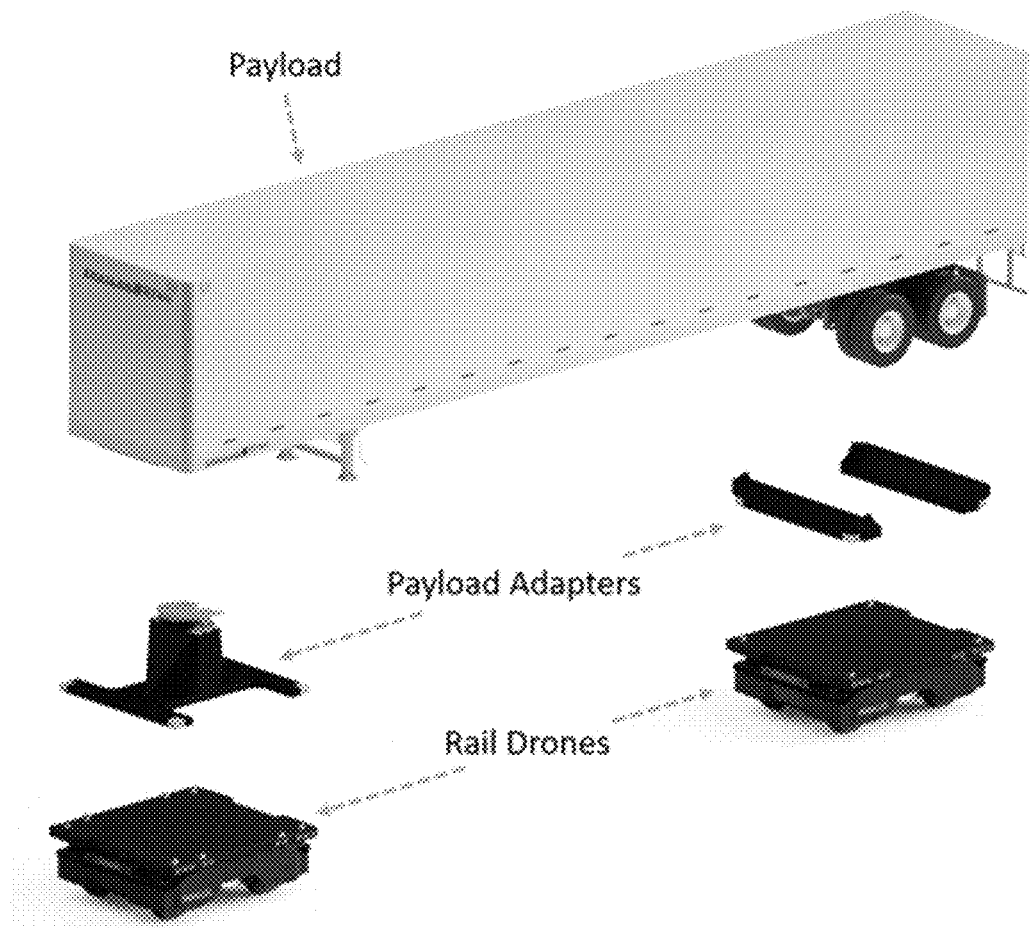
FIG. 23 is an exploded view of rail car in a variant of the Architecture.

A demonstration of this payload-driven car design is shown in FIG. 22. Four different payloads (20' dry box 2205, 40' dry box 2210, 40' flat container 2215, and 20' tank container 2220) can be carried with the exact two drones in any order or orientation.

The car topology is enabled by several factors, including the known structural properties and geometry of the payloads it is intended to carry. Where the vehicle or its existing fittings are not entirely sufficient to hold a payload, passive elements like payload adapters or rolling supports can be added to the car to support the payload.

To reduce the cost and rail occupation associated with movement of payloads through the rail network when using Rail Drones, one Rail Drone may be tasked with carrying multiple payloads.

Figure 24:
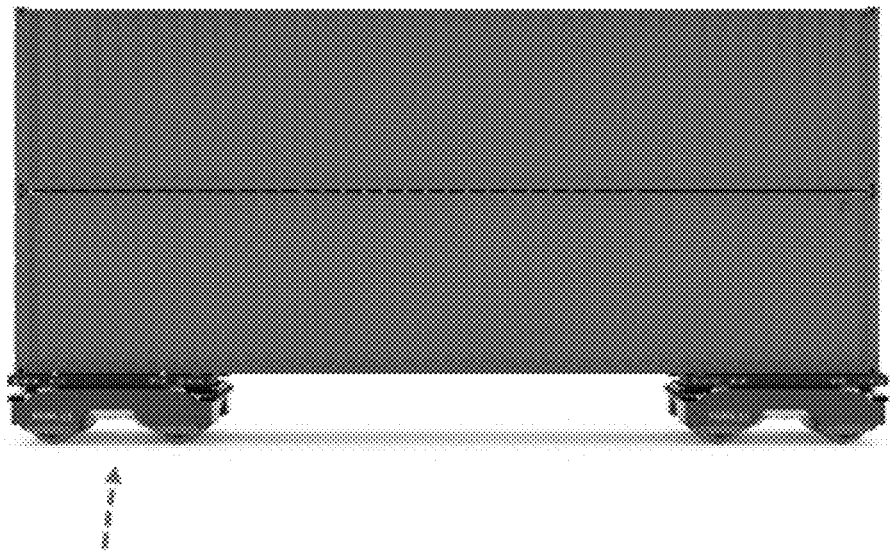
FIG. 24 is a side view of rail car in a variant of the Architecture.
Figure 25:
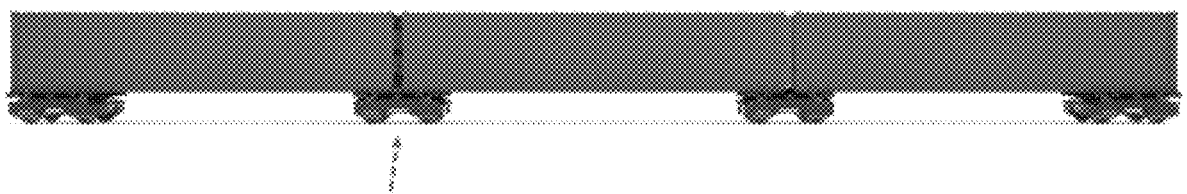
FIG. 25 is a side view of a multi-segment rail car in a variant of the Architecture.
Figure 26:
FIG. 26 is a side view of a double stacked multi-segment rail car in a variant of the Architecture.
Figure 27:
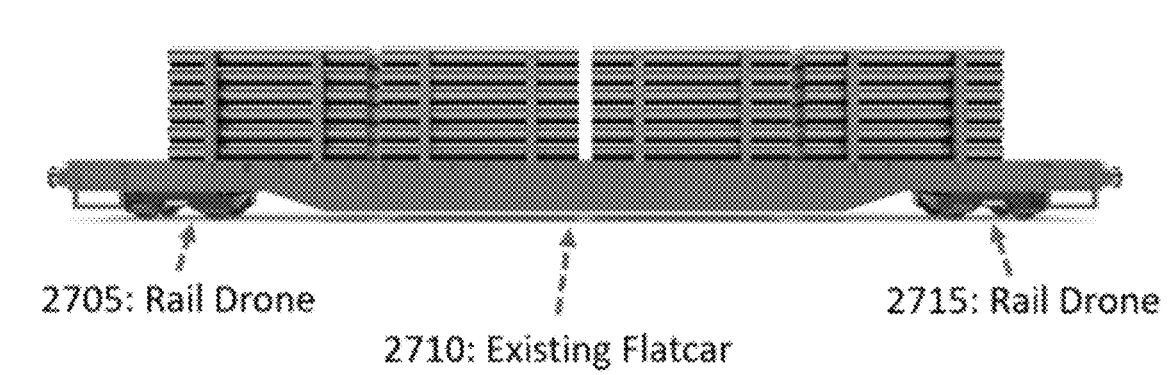
FIG. 27 is a side view of a flat car outfitted with rail drones in a variant of the Architecture.
Figure 28:
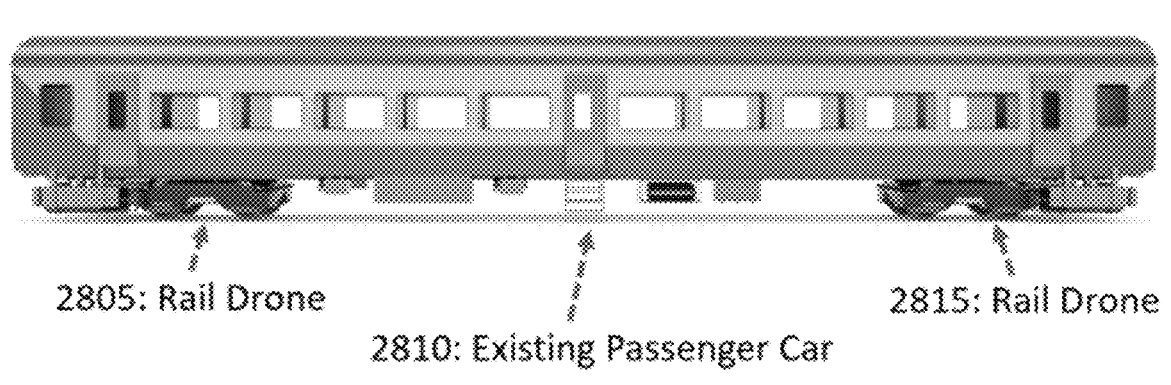
FIG. 28 is a side view of a crew car outfitted with rail drones in a variant of the Architecture.
Figure 29:
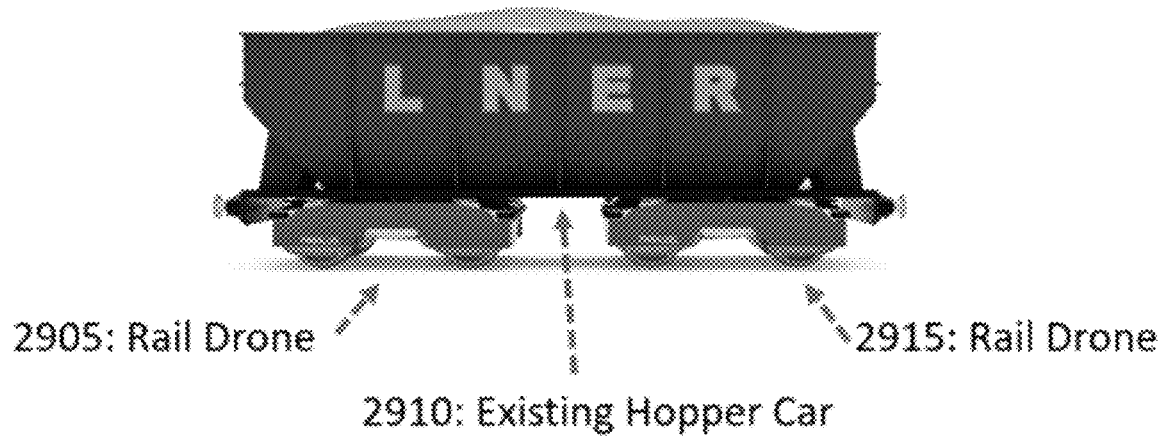
FIG. 29 is a side view of a heavy goods car outfitted with rail drones in a variant of the Architecture.
Figure 30:
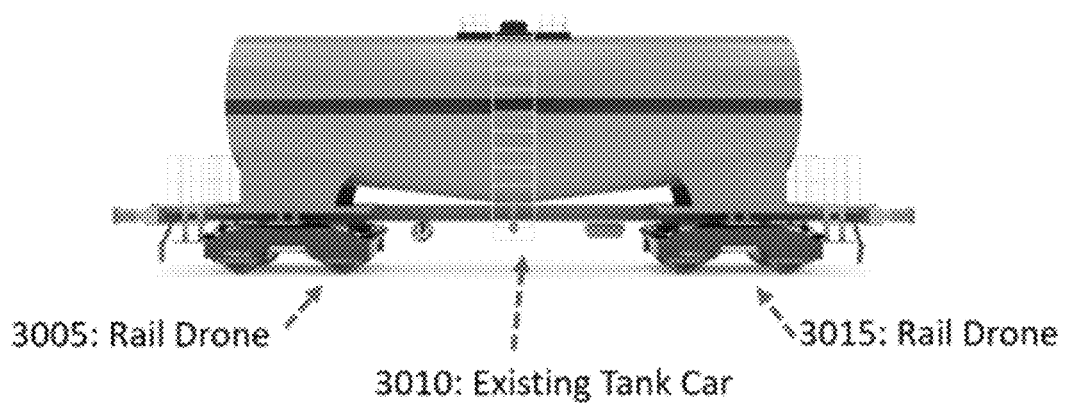
FIG. 30 is a side view of a tank car outfitted with rail drones in a variant of the Architecture.

The mode of carrying multiple payloads may be vertically through stacking multiple payloads on top of each other 2405 (an example is shown in FIG. 24), horizontally through supporting the ends of multiple payloads on one Rail Drone, 2505 (an example is shown in FIG. 25), or a combination of the two 2605 (an example is shown in FIG. 26). Though the pictured payloads are identical, they may be identical or dissimilar.

To help alleviate operational constraints with other sectors of the rail industry, a variety of existing rolling stock designs may be outfitted with Rail Drones. By replacing existing bogies with rail drones, a variety of individual cars (examples are shown in FIGS. 27-30) may gain the ability to navigate rail infrastructure without the aid of a locomotive. For these applications, the payload adaptor fitting could be used as-is, could use a custom payload adaptor fitting, or could use no payload adaptor fitting at all with the rolling stock installed directly on the bogie frame as with traditional bogies.

Cars may be configured to carry one payload as shown above or may carry multiple payloads like a conventional double-stack wellcar or multi-well double-stack wellcar.

Drones may operate together without payloads and act as a motive element for other passive assemblies. When physically coupled with proper adapters for traditional train hardware, these groups of drones may have the ability to replace traditional locomotives.

5.9 CAR HARDWARE ELEMENTS

As the payload carrying element in the Parallel architecture, the car's major hardware divisions are its driving and passive hardware elements.

Driving elements are self-propelled, may include drones, and may comprise one or all of the moving assemblies in the car. By including a Rail Drone in a Rail Car as disclosed herein, the car has the ability propel its payload through the rail network.

Passive elements are used to support the payload, either relative to the Rail Drone in the case of payload adapter fittings discussed previously or relative to the rail as with an automotive trailer or conventional freight bogie. Passive elements may also serve to physically couple car elements together.

Figure 31A:
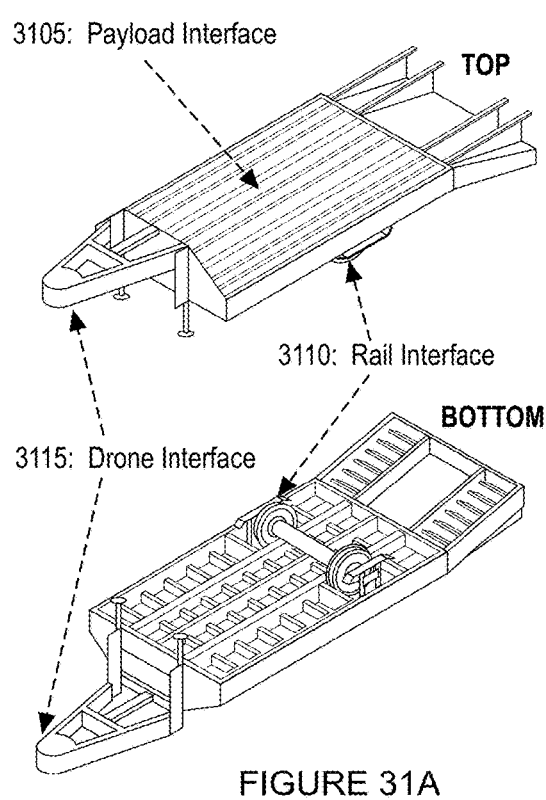
FIGS. 31A, 31B, and 31C are a first, second, and third isometric view example of passive car elements, respectively.
Figure 31B:
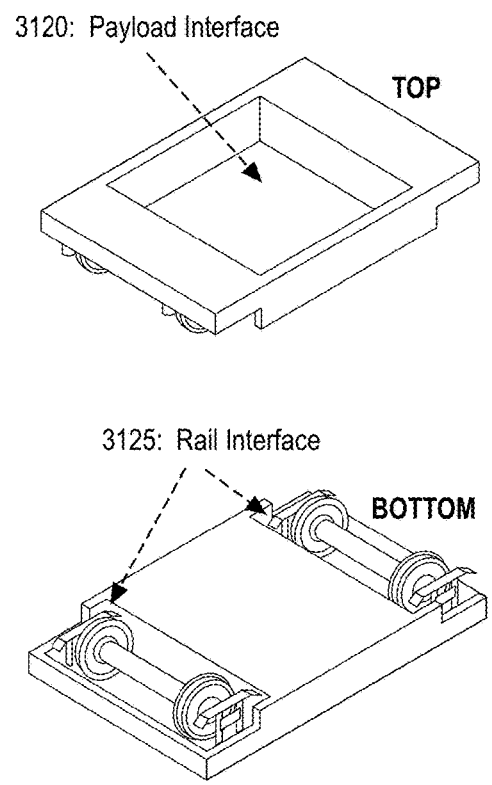
Figure 31C:
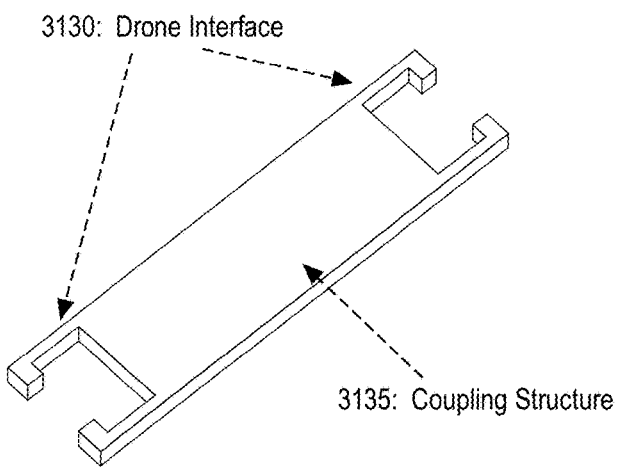

FIGS. 31A-C show various passive element configurations beyond the payload adapter fittings described earlier in this document. All serve to act as auxiliary or alternative interfaces between the rail, payload, and/or Rail Drone. A partially trailed passive element 3105 may rest on a combination of rail wheels 3110 and an adjacent Rail Drone 3115, or alternatively a fully trailed passive element 3120 may rest on rail wheels 3125. Where intra-car drone coordination is not desired, a passive element in the form of a physical coupling 3135 between Rail Drone interfaces 3130 may be used. Coupling can occur with a structure which operates below and/or independent of payload or could happen with a structure which spans the Rail Drones and carries the payload as with most rail cars.

Figure 32:
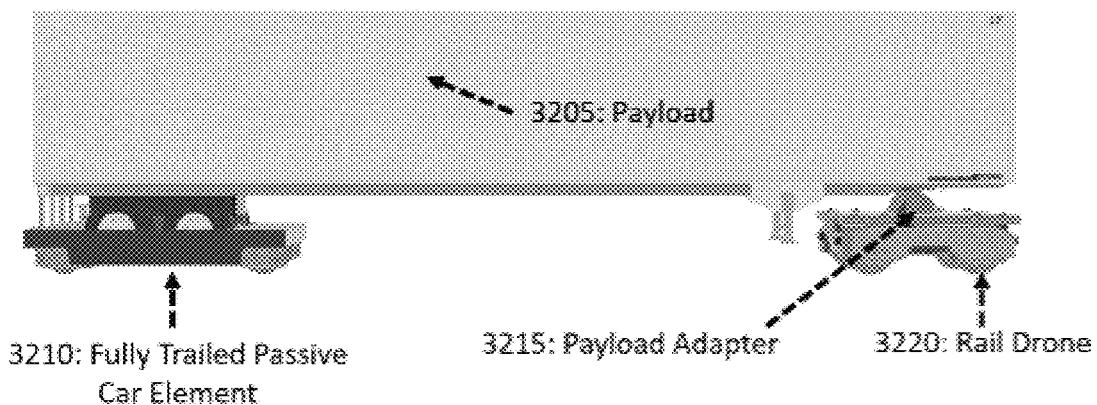
FIG. 32 is a side view example of a rail car in a variant of the Architecture.
Figure 33:
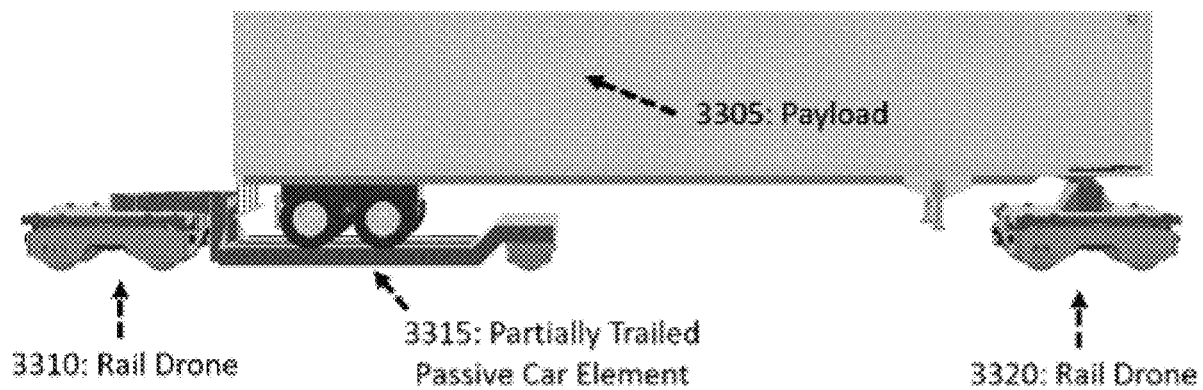
FIG. 33 is a side view example of a rail car in a variant of the Architecture.
Figure 34:
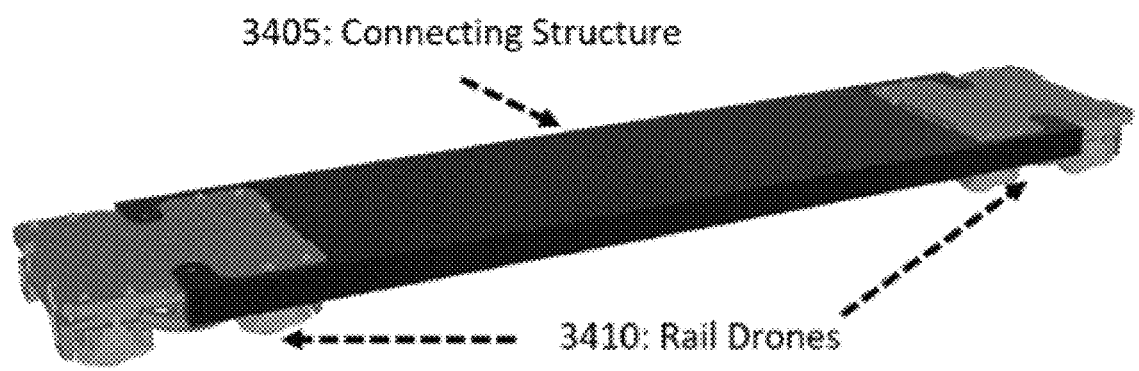
FIG. 34 is a trimetric view example of a passive structural element between two rail drones in a variant of the Architecture.

The various elements of the disclosed Rail Car can be combined to create and co-operate many car configurations with a limited number of simple, discrete building blocks. Examples are shown in FIGS. 32, 33, and 34.

5.10 AERODYNAMICS

Operating efficiency of the disclosed Rail Car during platooning is assured through the permanent physical configuration of the Rail Drone. Unlike trucks and trains which may use specialized aerodynamic fittings or carefully arranged payloads to improve aerodynamic efficiency, no modification of the car or payload are needed to assure optimal performance of the platooned product. Critical enablers for this are the payload interface which positions common payloads near the leading and trailing edges of the car and the low-profile bumpers which may make contact between platooning vehicles. The elements define the minimal air gap between platooning vehicles and payloads. This solution largely obsoletes the process of organizing the sequence of train payloads in order to improve efficiency, except for platoons featuring both single and double stacked containers.

5.11 PLATOON CONFIGURATION

Figure 35:
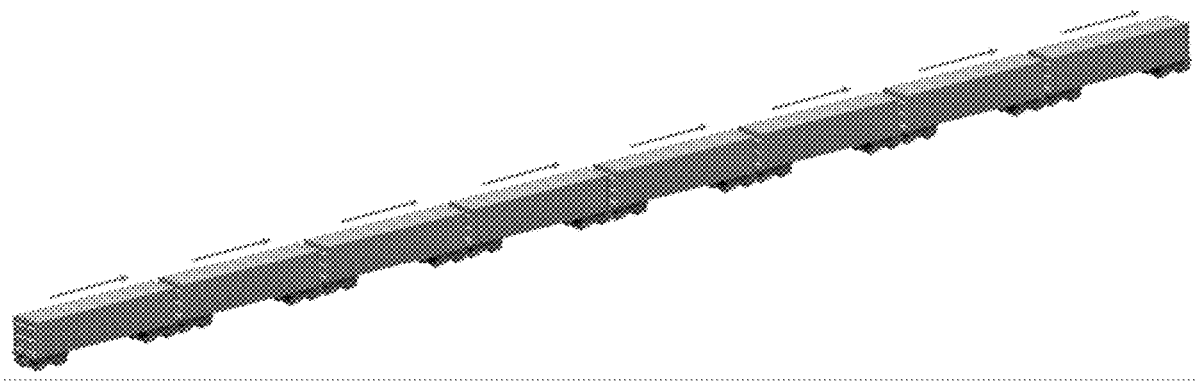
FIG. 35 is a schematic example of a formed platoon configuration.

A platoon can include of a plurality of Rail Car vehicles traveling in close proximity (an example is shown in FIG. 35). By traveling together, vehicles in a platoon may increase their range due to reduced aerodynamic drag and experience simplified operating logistics due to the reduced number of loose vehicles in a corridor. In the context of platooning, close proximity refers to spacing of less than a car length, down to the ideal of zero spacing. The disclosed configuration achieves this ideal though its payload interface design and largely maintaining physical contact between vehicles while platooning.

A platoon may include multiple Rail Drones, Rail Cars, or other vehicles. Different payload types with different origins, destinations, and customers may occupy the same platoon. The only essential element of a platoon is its close operation of several vehicles.

A platoon may operate alone in using the disclosed Rail Drones and Rail Cars, or in combination with conventional rail vehicles. Platoons may be escorted by manned systems while autonomy systems are being matured or more complex environments are being traversed. Platoons may also follow traditional locomotives or other rail stock.

Spacing within a platoon can be controlled through maintaining physical contact between adjacent cars as verified by some threshold of acceptable contact force or sustained movement of a switch. Spacing could also be controlled via time delay or tracking a favorable derivative of drive force while varying distance between vehicles.

Platooning is already leveraged at various levels by a variety of other industries, including road and rail freight. Multiple bluff bodies may platooning via controls as is normally discussed, or could be passively platooning via physical links. Traditionally, controlled platooning results in larger spacing between vehicles due to latency in computer or driver response. Coupled platooning offers the ability to maintain minimal gaps between bluff bodies but presents operational constraints of setting and releasing that configuration. The Parallel approach differs from other embodiments of platooning due its combination of close vehicle proximity and physical decoupling of vehicles.

6. PLATOONING

Platooning can include various operational phases, which can include:
assembly, operation, and disassembly. Assembly and disassembly may be treated as analogous and/or interchangeable for various aspects of discussion herein.

6.1 ASSEMBLY AND DISASSEMBLY

The assembly (formation) and disassembly (separation) of the coupled platooning (semi double trailers, road trains, and freight trains) come via physical couplings which are often engaged by a human operator. Some road vehicle demonstrations have demonstrated the establishment of software links between vehicle by a lead driver, but these are limited in number and deployment.

In the case of the disclosed Rail Platoon, all formation and disassembly of platoons may be created through software. This process may occur locally within a group of vehicles or remotely through operation of a centralized control system.

Figure 36:
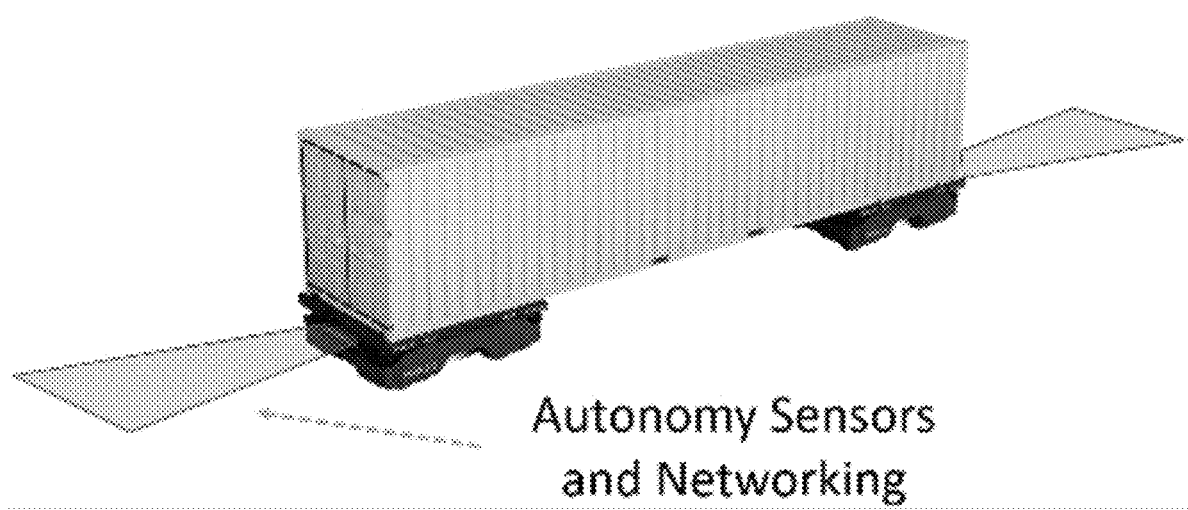
FIG. 36 is a diagrammatic example of a rail car platooning sensors.
Figure 37:
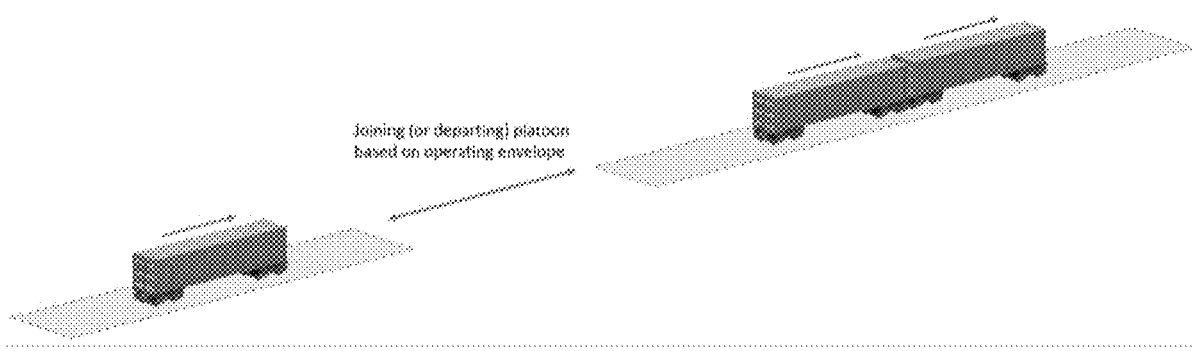
FIG. 37 is a diagrammatic example of a rail platoon assembly and disassembly.

The disclosed Rail Platoons may be formed when multiple vehicles begin operating using some level of shared controls within a specified range. Proximity may be established with external-facing sensors and antennas (examples are shown in FIG. 36 and FIG. 7). Acceptable proximity for pairing may be governed by the vehicle's ability to respond to the adjacent platoon's movement without linked controls (an example is shown in FIG. 37).

In an example, disassembling/separating the platoon can include:
controlling a first subset of a plurality of platooning rail cars to traverse along a first rail to a first destination; autonomously transitioning a second subset of the plurality from the first rail to a second rail; and controlling the second subset to traverse along the second rail to a second destination.

6.2 MAINTAINING A PLATOON

A number of approaches can and have been used to maintain close spacing of moving vehicles at speed. In the case of road vehicles, software and hardware links have been used to maintain control of adjacent vehicles. For trains, adjacent cars are physically linked.

Figure 38:
FIG. 38 is an isometric view example of a rail drone including load sensors.
Figure 39:
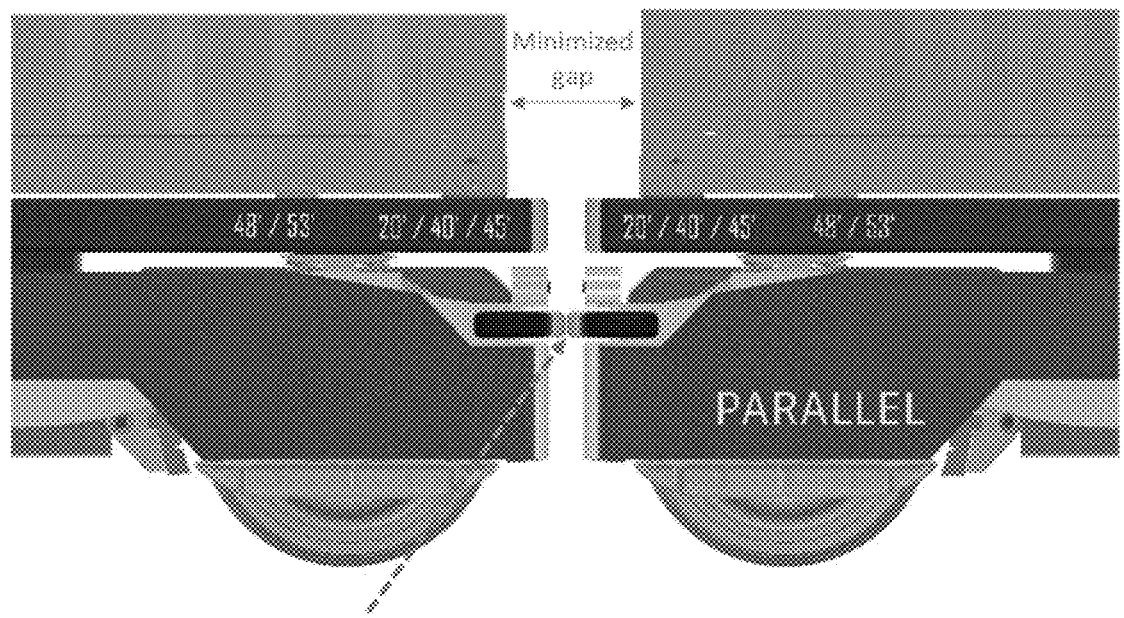
FIG. 39 is a partial side view of a coupling between rail drones during platooning.
Figure 40:
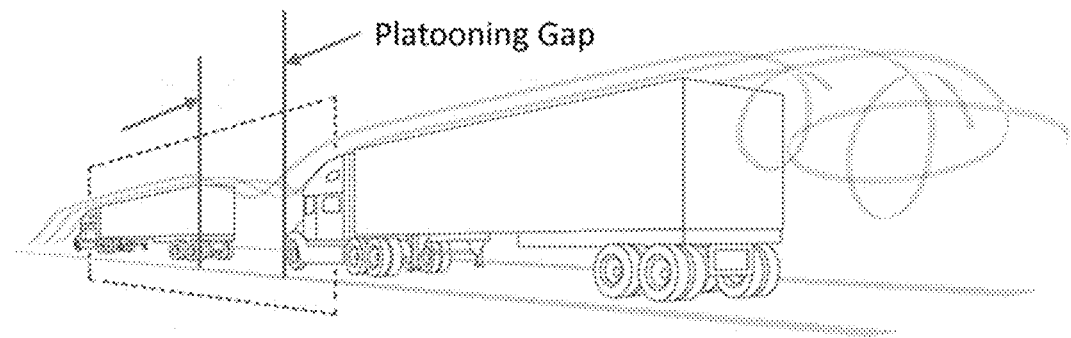
FIG. 40 is a diagrammatic example of a semi-truck topology and airstream.
Figure 41:
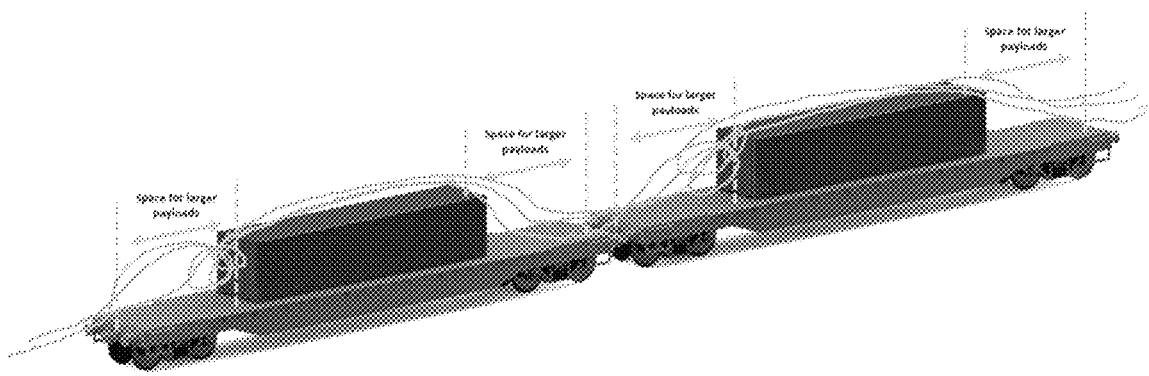
FIG. 41 is a diagrammatic example of a freight train flatcar container spacing and airstream.
Figure 42:
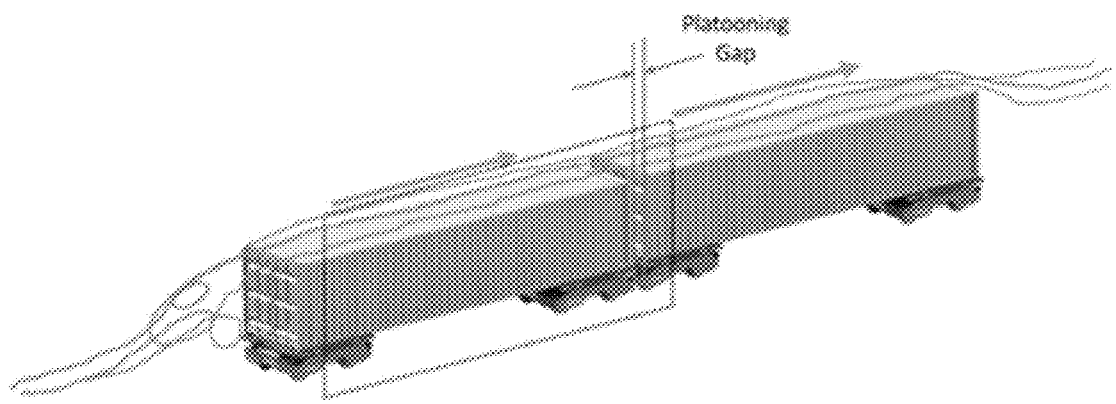
FIG. 42 is a diagrammatic representation of platoon container spacing and an example airstream for a variant of the Architecture.

For disclosed vehicles herein, configuration of the platoon is maintained through software over a local network between vehicles (an example is shown in FIG. 38). Operation of the platoon may be verified with the vehicle's external sensors or through load cells on contact points. The sensors may include laser rangefinders, radar, optical cameras or other sensors to determine the distance between vehicles, particularly in the case that the platooned vehicles are not physically touching. Control logic maintaining the platooned configuration my operate on contact forces, range distance, battery state of charge, motor power, motor torque, and other variables.

Figure 43:
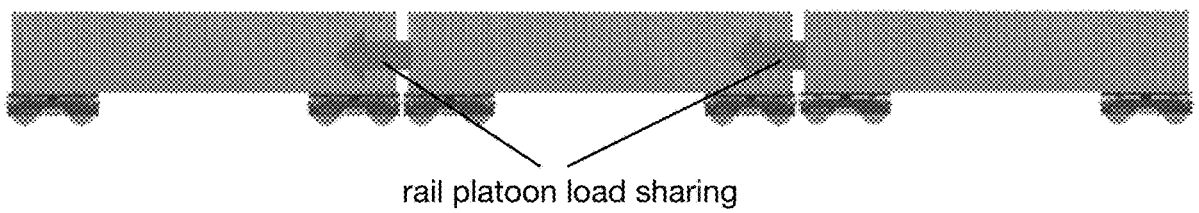
FIG. 43 is a diagrammatic example of a rail platoon load sharing.
Figure 44:
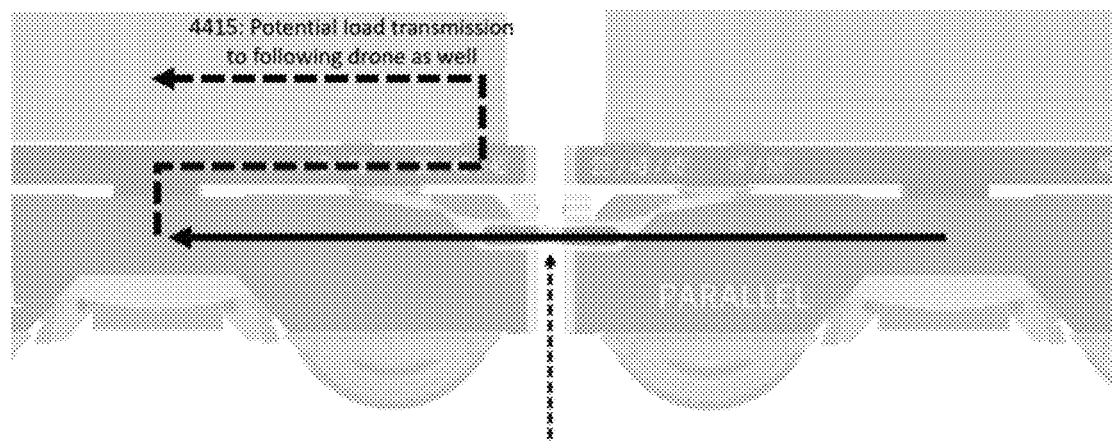
FIG. 44 is a diagrammatic example of a rail platoon load sharing.

In variants, maintaining a platoon can include maintaining physical contact to minimize aerodynamic drag of the platoon. By definition, a bluff body's aerodynamic drag is dominated by flow separation and pressure drag formed at its leading and trailing edges. As the body lengthens, its relatively constant pressure drag is diluted with increasing amounts of much-lower friction drag, allowing the system to asymptotically approach a lower, friction drag dominated value. Platooning of bluff bodies aims to achieve this dilution of pressure drag by eliminating instances of leading and trailing edge flow separation through close spacing of its bluff bodies within the platoon. The disclosed Rail Platoon beneficially minimizes this gap in at least two ways: use of a vehicle which maximizes the coplanarity of its payload and the leading edge of the vehicle (achieved through design of the payload-defined Rail Car configuration and the Rail Drone's payload interface design) and control of platooning by maintaining close proximity of the platooning vehicles (examples are shown in FIGS. 39-42). Proximity of vehicles may be assured via coordinated driving controls or maintaining physical contact between platooned vehicles. Physical contact may be achieved through mechanical coupling or alternatively via sustained contact (pushing) between platooned vehicles (an example is shown in FIGS. 43 and 44). Contact may be monitored via vehicle-facing force sensors, contact switches, or electromagnetic sensors (an example is shown in FIG. 44).

In variants, maintaining a platoon can include load sharing between vehicles to compensate for a drag gradient within a platoon. Even in a long platoon, the flow separation experienced by the leading and trailing edge vehicles causes local increases in those vehicles' power consumption. When operating in a tightly grouped platoon of identical vehicles without any collaboration, the range and speed performance of the group may be limited by these power-hungry positions. The platooning approach of maintaining contact between cars creates the opportunity for platoon members to push one another, distributing peak drag loads equally along the platoon. Since the last vehicle in a platoon can experience high drag and the vehicles may only be capable of pushing one another, the platoon may gradually achieve a largely negative gradient in state of charge gradient in the platoon. With the rearmost Rail Drone experiencing a drag spike due to its trailing edge separation, those drones may be the first to fall off to recharge. In any case, it may be aerodynamically optimal to maintain contact between vehicles. Thus, if force is ever lost on the bumper in a platoon, the motor current may be increased until contact is resumed or until state of charge limitations are surpassed, which may be defined as maintaining the Rail Drone's ability to reach the next charging station on its own.

6.3 LOADING

Unlike traditional trains whose cars are physically attached and subsequently brought to a location for loading, the disclosed Rail Cars are formed from loose (physically decoupled) Rail Drones (in Configurations G-I of FIG. 3) which need to be acquired and arranged for each payload. Thus, the loading process relies on a sequence of steps which pairs arbitrary drones with specific demand, co-locates them, and then safely joins them.

Figure 45:
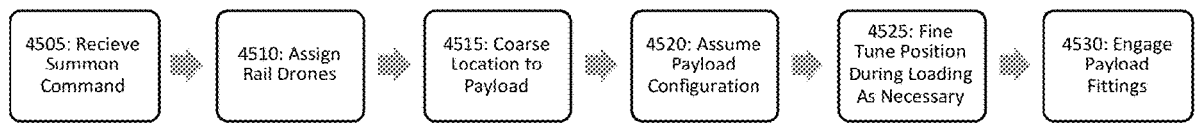
FIG. 45 is a flowchart representation of an example parallel car loading sequence.

An example process flow for creating a car is outlined in the FIG. 45. Starting with a payload loading request 4505, Rail Drones are assigned 4510 to the request. Assignment of a specific Rail Drone 4510 may be based on factors like proximity, state of charge, line of sight, time for relocation, or number of moves (for example spur switches) for relocation. Following assignment, Rail Drones self-relocate 4515 to the loading area under their own power. This relocation process may occur in a configuration which doesn't match that of the final payload, for example being tightly paired until arrival at the loading zone to reduce track length footprint during internal transit. Upon arrival at the loading zone, the Rail Drones position themselves for their intended payload 4520 including their relative position for the payload and absolute position for the loader. Once in place, during the loading process, the Rail Drones may perform additional position corrections 4525 based on feedback from the payload geometry and position. This could be via coordination with the operator or via internal feedback via onboard sensors like cameras. Once the payload has been installed, onboard fittings are engaged 4530 to fully restrain the payload. Within, before, or after this step 4530 additional verifications on weight, weight distribution, and fitting engagement may be performed to confirm that the Car can safely move its payload.

6.4 BRAKING

Unlike traditional trains whose coordinated braking is assured through a common air brake line which spans the entire assembly, Rail Platoons can coordinate braking through indirect means such as controls or external sensors. Successful coordination of braking activities can be critical when trying to avoid derailment or cascading failures within a platoon. The importance of this braking sequence depends on the performance margin which remains in the assembly in case of severe braking events. The subtlety and importance of these braking decisions at high speeds may be much greater than what is what's allowed at slower speeds.

Figure 46:
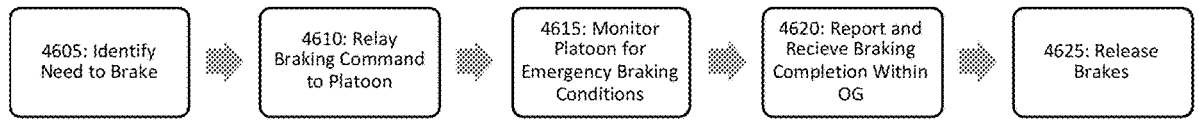
FIG. 46 is a flowchart representation of an example parallel car braking sequence.

An example process flow for braking is outlined in FIG. 46. Starting with identification of the need to brake 4605 whether internally or externally, this command is relayed back to the platoon 4610. The resulting echo of commands may be used to verify the safety of performing the braking command within the platoon, as well as verifying the size and source of the braking event which has been initiated. As braking is coordinated and initiated, accelerometers and external force sensors can be monitored within the platoon 4615 to detect off-nominal loads which may indicate faults. In the case of faults, difference in acceleration and loads within a platoon may be used to determine the location, nature, and severity of the fault. This feedback may be used to determine the correct response which may include release of braking force or application of additional force via mechanical brakes. Once the change in speed has been achieved and a braking release command is generated, this is again relayed 4620 to the platoon. The resulting echo of commands may be used to verify the safety of releasing brakes within the platoon.

However, platooning can include any other suitable elements.

7 EXAMPLES

In variants, a method for operating a rail network can include: forming a platoon comprising a first plurality of rail cars, each rail car of the first plurality including: a bumper; and an electric drivetrain including a battery and a traction motor; controlling the platoon to traverse within the rail network in a direction of transit while maintaining physical contact with adjacent rail cars of the platoon, including, at each rail car of the first plurality: determining a contact force at a leading end in the direction of transit, wherein the leading end includes the bumper; and autonomously controlling the electric drivetrain based on the contact force and a contact force threshold.

In variants, the method can additionally include: separating the platoon, including: controlling a first subset of the first plurality of rail cars to traverse along a first rail to a first destination; autonomously transitioning a second subset of the first plurality from the first rail to a second rail; and controlling the second subset to traverse along the second rail to a second destination.

In variants, the method of can additionally include: performing coordinated braking, including: determining a braking command; relaying the braking command to each of the first plurality of rail cars; and autonomously braking each electric drivetrain independently. In an example, independently braking the electric drivetrain includes regeneratively braking the traction motor.

In variants, platoon can further include a lead rail car ahead of the first plurality in the direction of transit, wherein the lead rail car is pushed by the first plurality based on the contact force of a forwardmost rail car of the first plurality in the direction of transit. In an example, the lead rail car is autonomous. In a second example, the method can additionally include: at the lead car, wirelessly receiving control instructions from a fleet management system; and controlling a drivetrain of the lead rail car based on the control instructions.

In variants, the platoon is formed during mid-transit motion of the first plurality of rail cars.

In variants, the method can additionally include: at a first car of the plurality, pushing an adjacent car based on a drag gradient within the platoon.

In variants, the method can additionally include: adjusting a length of a rail car of the plurality based on a payload length to minimize air gaps at opposing ends of the rail car.

In variants, each rail car of the plurality includes a pair of rail drones which are physically decoupled, each rail drone of the pair including: a railway bogie platform; a drone drivetrain mounted to the railway bogie platform, including: a battery; and a traction motor electrically coupled to the battery; and a payload interface rotatably coupled to the railway bogie platform, wherein the electric drivetrain includes a drone drivetrain of a first rail drone of the pair. In variants, forming the platoon can include loading a rail car of the first plurality with a payload, including: mechanically connecting opposing ends of the payload to the payload interfaces of the pair of rail drones. In variants, loading the rail car can include self-relocating the pair of rail drones from a tightly-paired configuration into a payload configuration based on a length of the payload. In variants, in the tightly-paired configuration the rail drones of the pair can be positioned to minimize a track length footprint.

In variants, a system for a rail network includes: a pair of rail drones which are physically decoupled, each rail drone of the pair includes: a railway bogie platform; a drivetrain mounted to the railway bogie platform, including: a battery; and a traction motor electrically coupled to the battery; and a payload interface rotatably coupled to the railway bogie platform; and a payload defining a payload length between opposing ends of the payload, the opposing ends of the payload removably fixedly connected to the payload interfaces of the pair and structurally connecting the pair of rail drones, wherein a distance between the payload interfaces of the pair set based on the payload length.

In variants, each of the pair of rail drones further includes: a first bumper mounted to the railway bogie platform at a first end; and a contact force sensor mounted at the first end.

In variants, each of the pair of rail drones further includes a second bumper opposing the first bumper along a long axis of the drone, wherein the second bumper is arranged below the payload.

In variants, the drivetrain of each of the pair of rail drones is an autonomous drivetrain configured to autonomously control the battery and traction motor.

In variants, each of the rail drones comprises a first and second set of external-facing sensors communicatively connected to the autonomous drivetrain, wherein the first set of external-facing sensors are directed away from the payload, wherein the second set of external-facing sensors is directed towards at least one of the payload and a remaining rail drone of the pair.

In variants, the pair of rail drones defines a pair of outboard ends in a long axis, wherein the payload is arranged with each of the opposing ends between an outboard end of the pair and an axis of wheel rotation which is nearest to the respective outboard end.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the FIGURES and claims, modifications and changes can be made to the preferred embodiments of the invention without departing from the scope of this invention defined in the following claims.

We claim:

1. A method for operating a rail network comprising:
    forming a platoon comprising a first plurality of rail cars, each rail car of the first plurality comprising:
        a bumper; and
        an electric drivetrain comprising a battery and a traction motor; and
    controlling the platoon to traverse within the rail network in a direction of transit while maintaining physical contact with adjacent rail cars of the platoon, comprising, at each rail car of the first plurality:
        determining a contact force at a leading end in the direction of transit, wherein the leading end comprises the bumper; and
        autonomously controlling the electric drivetrain based on the contact force and a contact force threshold.

2. The method of claim 1, further comprising: separating the platoon, comprising:
    controlling a first subset of the first plurality of rail cars to traverse along a first rail to a first destination;
    autonomously transitioning a second subset of the first plurality from the first rail to a second rail; and
    controlling the second subset to traverse along the second rail to a second destination.

3. The method of claim 1, further comprising performing coordinated braking, comprising:
    determining a braking command;
    relaying the braking command to each of the first plurality of rail cars; and
    autonomously braking each electric drivetrain independently.

4. The method of claim 3, wherein independently braking the electric drivetrain comprises regeneratively braking the traction motor.

5. The method of claim 1, wherein the platoon further comprises a lead rail car ahead of the first plurality in the direction of transit, wherein the lead rail car is pushed by the first plurality based on the contact force of a forwardmost rail car of the first plurality in the direction of transit.

6. The method of claim 5, wherein the lead rail car is autonomous.

7. The method of claim 5, wherein the method further comprises:
    at the lead car, wirelessly receiving control instructions from a fleet management system; and
    controlling a drivetrain of the lead rail car based on the control instructions.

8. The method of claim 1, wherein the plurality comprises a rearmost rail car relative to the direction of transit, wherein the method further comprises: at the rearmost rail car, independently departing from a loading location prior to forming the platoon.

9. The method of claim 1, wherein the platoon is formed during mid-transit motion of the first plurality of rail cars.

10. The method of claim 1, further comprising: at a first car of the plurality, pushing an adjacent car based on a drag gradient within the platoon.

11. The method of claim 1, wherein the method further comprises:
    adjusting a length of a rail car of the plurality based on a payload length to minimize air gaps at opposing ends of the rail car.

12. The method of claim 1, wherein each rail car of the plurality comprises a pair of rail drones which are physically decoupled, each rail drone of the pair comprising:
    a railway bogie platform;
    a drone drivetrain mounted to the railway bogie platform, comprising:
        a battery; and
        a traction motor electrically coupled to the battery; and
    a payload interface rotatably coupled to the railway bogie platform, wherein the electric drivetrain comprises a drone drivetrain of a first rail drone of the pair.

13. The method of claim 12, wherein forming the platoon comprises loading a rail car of the first plurality with a payload, comprising:
    mechanically connecting opposing ends of the payload to the payload interfaces of the pair of rail drones.

14. The method of claim 13, wherein loading the rail car comprises self-relocating the pair of rail drones from a tightly-paired configuration into a payload configuration based on a length of the payload.

15. The method of claim 14, wherein in the tightly-paired configuration the rail drones of the pair are positioned to minimize a track length footprint.

16. A system for a rail network comprising:
a pair of rail drones which are physically decoupled, each rail drone of the pair comprising:
a railway bogie platform;
a drivetrain mounted to the railway bogie platform, comprising:
a battery; and
a traction motor electrically coupled to the battery; and
a payload interface rotatably coupled to the railway bogie platform; and
a payload defining a payload length between opposing ends of the payload, the opposing ends of the payload removably fixedly connected to the payload interfaces of the pair and structurally connecting the pair of rail drones, wherein a distance between the payload interfaces of the pair is set based on the payload length.

17. The method of claim 16, wherein each of the pair of rail drones further comprises:
a first bumper mounted to the railway bogie platform at a first end; and
a contact force sensor mounted at the first end.

18. The method of claim 17, wherein each of the pair of rail drones further comprises a second bumper opposing the first bumper along a long axis of the drone, wherein the second bumper is arranged below the payload.

19. The method of claim 16, wherein the drivetrain of each of the pair of rail drones is an autonomous drivetrain configured to autonomously control the battery and traction motor.

20. The method of claim 19, wherein each of the rail drones comprises a first and second set of external-facing sensors communicatively connected to the autonomous drivetrain, wherein the first set of external-facing sensors are directed away from the payload, wherein the second set of external-facing sensors is directed towards at least one of the payload and a remaining rail drone of the pair.

21. The method of claim 16, wherein the pair of rail drones defines a pair of outboard ends in a long axis, wherein the payload is arranged with each of the opposing ends between an outboard end of the pair and an axis of wheel rotation which is nearest to the respective outboard end.

* * * * *